(12) United States Patent
Kurokawa

(10) Patent No.: US 12,570,812 B2
(45) Date of Patent: Mar. 10, 2026

(54) FIBER-REINFORCED MOLDED BODY AND METHOD FOR PRODUCING FIBER-REINFORCED MOLDED BODY

(71) Applicant: ZEON CORPORATION, Tokyo (JP)

(72) Inventor: Hisashi Kurokawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 8 days.

(21) Appl. No.: 18/276,754

(22) PCT Filed: Feb. 22, 2022

(86) PCT No.: PCT/JP2022/007121
§ 371 (c)(1),
(2) Date: Aug. 10, 2023

(87) PCT Pub. No.: WO2022/181579
PCT Pub. Date: Sep. 1, 2022

(65) Prior Publication Data
US 2024/0124662 A1     Apr. 18, 2024

(30) Foreign Application Priority Data
Feb. 26, 2021     (JP) ................................. 2021-030276

(51) Int. Cl.
*C08J 5/10*       (2006.01)
*C08K 7/22*       (2006.01)
(52) U.S. Cl.
CPC    *C08J 5/10* (2013.01); *C08K 7/22* (2013.01); *C08J 2371/02* (2013.01)
(58) Field of Classification Search
CPC ...................................................... C08K 7/22
See application file for complete search history.

(56) References Cited

U.S. PATENT DOCUMENTS

| | | | |
|---|---|---|---|
| 2018/0237548 A1 | 8/2018 | Kitagawa | |
| 2021/0002497 A1* | 1/2021 | Iga | ........................ C08F 220/14 |
| 2022/0251247 A1 | 8/2022 | Hirata | |

FOREIGN PATENT DOCUMENTS

| | | | | |
|---|---|---|---|---|
| EP | 4071187 A1 | 10/2022 | | |
| EP | 4223801 A1 | 8/2023 | | |
| EP | 4249526 A1 | 9/2023 | | |
| EP | 4286423 A1 | 12/2023 | | |
| JP | H04-310726 A | 11/1992 | | |
| JP | H05-239259 A | 9/1993 | | |
| JP | 2008-038036 A | 2/2008 | | |
| JP | 2009-242477 A | 10/2009 | | |
| JP | 2020033503 A | * 3/2020 | | |
| WO | 2004/067638 A1 | 8/2004 | | |
| WO | 2017/043281 A1 | 3/2017 | | |
| WO | WO-2019188996 A1 | * 10/2019 | ............. | B41M 5/42 |
| WO | 2020/261926 A1 | 12/2020 | | |

OTHER PUBLICATIONS

Yusriah, L., M. Mariatti, A. Abu Bakar, The properties of vinyl ester composites reinforced with different types of woven fabric and hollow phenolic microspheres, J. of Reinforced Plastics and Composites, vol. 29, No. 20 (2010), pp. 3066-3073. (Year: 2010).*
Machine translation of WO 2004/067638 A1, published Aug. 12, 2004.*
Notification of Transmittal of Translation of the International Preliminary Report on Patentability (Form PCT/IB/338) issued in counterpart International application No. PCT/JP2022/007121 mailed Sep. 7, 2023 with Forms PCT/IB/373 and PCT/ISA/237. (6 pages).
Extended (Supplementary) European Search Report dated Dec. 20, 2024, issued in counterpart EP Application No. 22759615.2. (9 pages).

* cited by examiner

*Primary Examiner* — Vickey Nerangis
(74) *Attorney, Agent, or Firm* — WHDA, LLP

(57)     ABSTRACT
To provide a weight-reduced, fiber-reinforced molded body. A fiber-reinforced molded body comprising a matrix resin, reinforcing fibers and hollow particles, wherein the hollow particles comprise a shell containing a resin and a hollow portion surrounded by the shell; wherein the shell contains, as the resin, a polymer in which from 80 parts by mass or more of a crosslinkable monomer unit is contained in 100 parts by mass of all monomer units; and wherein, in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 5% by mass of the hollow particles submerge in the acetone.

2 Claims, 2 Drawing Sheets

1

FIBER-REINFORCED MOLDED BODY AND METHOD FOR PRODUCING FIBER-REINFORCED MOLDED BODY

TECHNICAL FIELD

The disclosure relates to a fiber-reinforced molded body comprising a matrix resin, reinforcing fibers and hollow particles, and a method for producing the fiber-reinforced molded body.

BACKGROUND ART

A fiber reinforced plastic (FRP) that the strength is increased by mixing a resin and reinforcing fibers, is light-weight and excellent in mechanical properties such as strength and elastic modulus. Accordingly, it is widely used in various kinds of fields such as the automotive, aircraft, vessel, architecture, electronic and electric fields.

A fiber reinforced plastic is obtained by, for example, impregnating reinforcing fibers with a matrix resin. However, when a weight reducing material such as a foaming agent and an inorganic balloon is mixed for further weight reduction of a fiber reinforced plastic, there are following problems: the viscosity of a resin composition is increased to make the impregnation with the matrix resin difficult, and uniform dispersion of the weight reducing material is less likely to occur.

Patent Literature 1 discloses a fiber reinforced plastic containing hollow fine particles which are produced by polymerizing a reactive monomer containing 20% by weight or more of a crosslinkable monomer, which have at least one outside wall layer with a thickness of 20 nm or more on the outermost layer, which have a hollow rate of 20% by volume to 95% by volume, and which have an average particle diameter of 0.1 μm to 100 μm. In Examples of Patent Literature 1, a reactive monomer containing 30% by weight to 75% by weight of a crosslinkable monomer was used for the synthesis of the hollow fine particles.

CITATION LIST

Patent Literature

Patent Literature 1: Japanese Patent Application Laid-Open (JP-A) No. 2009-242477

SUMMARY OF INVENTION

Technical Problem

Patent Literature 1 describes that high strength and low specific gravity can be achieved when the above-specified hollow fine particles are incorporated in the fiber reinforced plastic without erosion by the raw material monomer of the matrix resin or by an organic solvent.

However, the hollow fine particles described in Patent Literature 1 has insufficient solvent resistance to polar solvents. Accordingly, when the hollow fine particles described in Patent Literature 1 and a polar solvent as a dilution solvent are incorporated in the resin composition with which the reinforcing fibers will be impregnated, the polar solvent penetrates into the hollow fine particles. As a result, the hollow fine particles are likely to deform or collapse; the void in the interior of the particles cannot be maintained; and sufficient weight reduction of the particles is not achieved.

An object of the present disclosure is to provide a weight-reduced, fiber-reinforced molded body and a method for producing the fiber-reinforced molded body.

Solution to Problem

The present disclosure focused attention on the polar solvent permeability of the shell of hollow particles and found the following: hollow particles such that the shell is rendered less permeable to acetone by controlling the composition of the shell, the method for forming the shell and so on, are less likely to collapse in a resin composition containing a solvent and during mold processing of the resin composition, and the hollow particles can be suitably used as a weight reducing material for fiber-reinforced molded bodies.

According to the present disclosure, there is provided a fiber-reinforced molded body comprising a matrix resin, reinforcing fibers and hollow particles, wherein the hollow particles comprise a shell containing a resin and a hollow portion surrounded by the shell;

wherein the shell contains, as the resin, a polymer in which from 80 parts by mass or more of a crosslinkable monomer unit is contained in 100 parts by mass of all monomer units; and wherein, in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 5% by mass of the hollow particles submerge in the acetone.

In the fiber-reinforced molded body of the present disclosure, the polymer contained in the shell of the hollow particles preferably further contains a hydrophilic non-crosslinkable monomer unit derived from a hydrophilic non-crosslinkable monomer having a solubility of 0.3 g/L or more in distilled water at 20° C. Moreover, in 100 parts by mass of all monomer units of the polymer, a content of the hydrophilic non-crosslinkable monomer unit is preferably from 2 parts by mass to 20 parts by mass, and a content of the crosslinkable monomer unit is preferably from 80 parts by mass to 98 parts by mass.

In the fiber-reinforced molded body of the present disclosure, the polymer contained in the shell of the hollow particles preferably contains, as the crosslinkable monomer unit, a trifunctional or higher-functional crosslinkable monomer unit derived from a trifunctional or higher-functional crosslinkable monomer. Moreover, a content of the trifunctional or higher-functional crosslinkable monomer unit in 100 parts by mass of all monomer units of the polymer, is preferably from 5 parts by mass to 50 parts by mass.

According to the present disclosure, there is also provided a method for producing a fiber-reinforced molded body comprising a matrix resin, reinforcing fibers and hollow particles, the method comprising:

producing hollow particles, preparing a resin composition containing the hollow particles thus obtained, the matrix resin and the solvent, and impregnating the reinforcing fibers with the resin composition, wherein a method for producing the hollow particles comprises:

preparing a mixture liquid containing a first polymerizable monomer, a hydrocarbon solvent, a dispersion stabilizer and an aqueous medium, suspending the mixture liquid to prepare a suspension in which droplets of a monomer composition containing the first polymerizable monomer and the hydrocarbon solvent are dispersed in the aqueous medium, and subjecting the suspension to a polymerization reaction;

wherein the mixture liquid contains a crosslinkable monomer as the first polymerizable monomer, and a content of the crosslinkable monomer in 100 parts by mass of the first polymerizable monomer is 80 parts by mass or more; and wherein, during subjecting the suspension to the polymerization reaction, when a polymerization conversion rate of the first polymerizable monomer reaches 93% by mass or more, a second polymerizable monomer having a solubility of 0.3 g/L or more in distilled water at 20° C., is added to the suspension, and the suspension is further subjected to a polymerization reaction.

In the method for producing the fiber-reinforced molded body, during subjecting the suspension to the polymerization reaction in producing the hollow particles, the amount of the added second polymerizable monomer is preferably from 3 parts by mass to 15 parts by mass, with respect to 100 parts by mass of the first polymerizable monomer.

In the method for producing the fiber-reinforced molded body, when preparing the mixture liquid in producing the hollow particles, the first polymerizable monomer preferably contains a trifunctional or higher-functional crosslinkable monomer as the crosslinkable monomer. Moreover, a content of the trifunctional or higher-functional crosslinkable monomer in 100 parts by mass of the first polymerizable monomer, is preferably from 5 parts by mass to 50 parts by mass.

In the method for producing the fiber-reinforced molded body, when preparing the mixture liquid in producing the hollow particles, the dispersion stabilizer is preferably an inorganic dispersion stabilizer.

In the method for producing the fiber-reinforced molded body, the inorganic dispersion stabilizer is more preferably a sparingly water-soluble metal salt.

Advantageous Effects of Invention

According to the present disclosure, a weight-reduced, fiber-reinforced molded body and a method for producing the fiber-reinforced molded body are provided.

BRIEF DESCRIPTION OF DRAWINGS

In the accompanying drawings.

DESCRIPTION OF EMBODIMENTS

Figure 1:
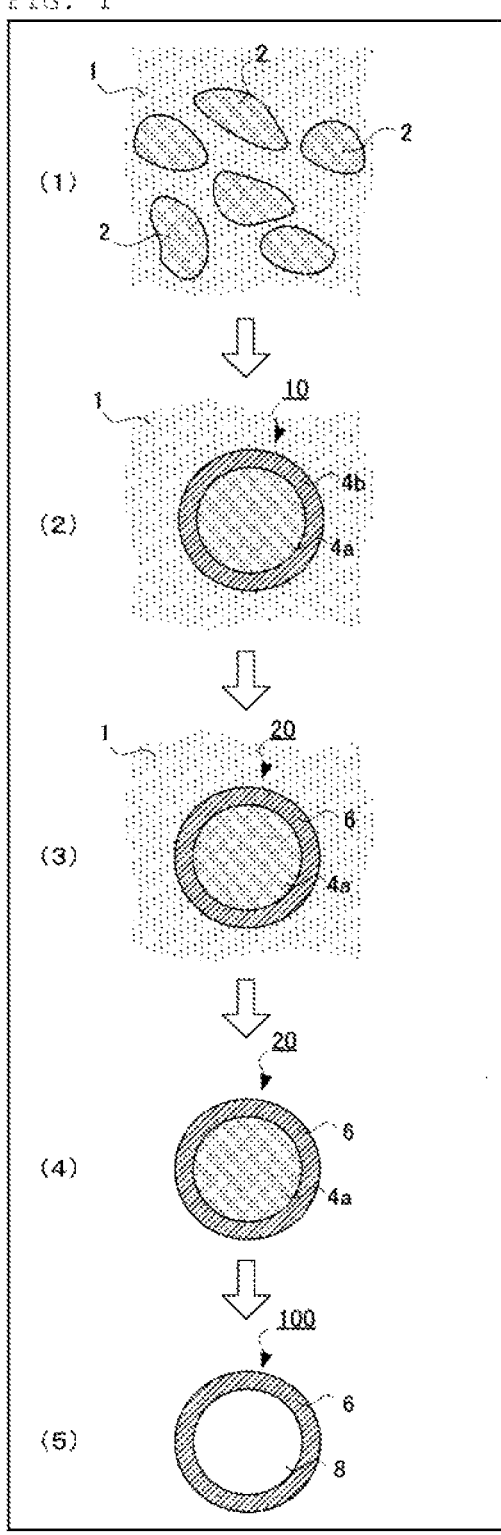
FIG. 1 is a diagram illustrating an example of the method for producing hollow particles used in the fiber-reinforced molded body of the present disclosure.

In the present disclosure, "A to B" in a numerical range is used to describe a range in which the numerical value A is included as the lower limit value and the numerical value B is included as the upper limit value.

Also in the present disclosure, (meth)acrylate means each of acrylate and methacrylate; (meth)acryl means each of acryl and methacryl; and (meth)acryloyl means each of acryloyl and methacryloyl.

Also in the present disclosure, the term "polymerizable monomer" means a compound having an addition-polymerizable functional group (in the present disclosure, it may be simply referred to as a "polymerizable functional group"). Also in the present disclosure, as the polymerizable monomer, a compound having an ethylenically unsaturated bond as the addition-polymerizable functional group, is generally used.

There are two kinds of polymerizable monomers: a non-crosslinkable monomer and a crosslinkable monomer. The non-crosslinkable monomer is a polymerizable monomer which has only one polymerizable functional group, and the crosslinkable monomer is a polymerizable monomer which has two or more polymerizable functional groups and which forms crosslinking in resin by a polymerization reaction.

Also in the present disclosure, the polymerizable monomer having a solubility of 0.3 g/L or more in distilled water at 20° C., is referred to as "hydrophilic monomer", and the polymerizable monomer having a solubility of less than 0.3 g/L in distilled water at 20° C., is referred to as "non-hydrophilic monomer".

Also in the present disclosure, "curing" means solidifying through or not through a chemical reaction.

I. Fiber-Reinforced Molded Body

The fiber-reinforced molded body of the present disclosure is a fiber-reinforced molded body comprising a matrix resin, reinforcing fibers and hollow particles, wherein the hollow particles comprise a shell containing a resin and a hollow portion surrounded by the shell;

wherein the shell contains, as the resin, a polymer in which from 80 parts by mass or more of a crosslinkable monomer unit is contained in 100 parts by mass of all monomer units; and wherein, in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 5% by mass of the hollow particles submerge in the acetone.

For example, the fiber-reinforced molded body of the present disclosure is obtained by, as in the below-described production method of the present disclosure, impregnating the reinforcing fibers with the resin composition containing the matrix resin, the hollow particles and the solvent, and molding the resin composition. The fiber-reinforced molded body of the present disclosure may be an intermediate product such as a prepreg in which the resin composition is in a semi-cured state, or it may be a finished product obtained by curing the resin composition.

In the case of a conventional fiber-reinforced molded body obtained by impregnating reinforcing fibers with a resin composition containing hollow particles, since the solvent or resin in the resin composition (a varnish) permeates the interior of the hollow particles, the hollow particles become susceptible to collapse. As a result, the hollow particles cannot maintain the void in the interior thereof and, in some cases, they cannot sufficiently reduce the weight of a molded body thus obtained.

In the case of the fiber-reinforced molded body of the present disclosure, the contained hollow particles are less likely to collapse in the varnish and during the process of impregnating the reinforcing fibers with the varnish and drying and curing the varnish; moreover, the void in the interior of the particles can be maintained even in a molded body. Accordingly, the fiber-reinforced molded body of the present disclosure is a lighter-weight fiber-reinforced molded body than conventional fiber-reinforced molded bodies containing hollow particles.

Hereinafter, the hollow particles, matrix resin and reinforcing fibers contained in the fiber-reinforced molded body of the present disclosure will be described.

I-1. Hollow Particles

The hollow particles contained in the fiber-reinforced molded body of the present disclosure are particles which comprise a resin-containing shell (outer shell) and a hollow portion surrounded by the shell.

In the present disclosure, the term "hollow portion" means a hollow space clearly distinguished from the shell of hollow particles formed from a resin material. The shell of the hollow particles may have a porous structure. In this case, the hollow portion has a size that is clearly distinguishable from many minute spaces uniformly dispersed in the porous structure.

The hollow portion of the hollow particles can be determined by, for example, SEM observation of a cross section of the particles or TEM observation of the particles as they are.

From the viewpoint of weight reduction, the hollow portion of the hollow particles of the present disclosure is preferably filled with gas such as air or nitrogen, or it is preferably in a reduced pressure state close to vacuum.

In the hollow particles used in the fiber-reinforced molded body of the present disclosure, the polymer contained in the shell contains 80 parts by mass or more of a crosslinkable monomer unit in 100 parts by mass of all monomer units. Accordingly, the content of the crosslinkable monomer unit in the shell of the hollow particles is large, and it is presumed that the covalent bond network is more tightly strung in the shell. Also, the hollow particles which are used in the fiber-reinforced molded body of the present disclosure and which submerge in the acetone in the hollow particle immersion test, are less than 5% by mass. Accordingly, the hollow particles have such a dense structure, that acetone is less likely to permeate the shell, and it is presumed that the crosslinked structure of the shell is more densified. It is thought that the solvent resistance and strength of the hollow particles used in the fiber-reinforced molded body of the present disclosure, are improved since the hollow particles have, as just described above, a denser structure than conventional hollow particles that the shell contains a large amount of crosslinkable monomer unit. Accordingly, it is thought that a solvent is less likely to permeate the interior of the hollow particles, and due to the excellent strength, the hollow particles are less likely to collapse even when adding the particles to the varnish, impregnating the reinforcing fibers with the varnish, and drying and curing the varnish in the reinforcing fibers, and the void in the interior of the particles is maintained in the fiber-reinforced molded body.

Hereinafter, the hollow particles used in the fiber-reinforced molded body of the present disclosure may be referred to as the hollow particles of the present disclosure, or they may be simply referred to as the hollow particles.

The void ratio of the hollow particles of the present disclosure is preferably 60% or more, more preferably 65% or more, and still more preferably 70% or more. When the void ratio is equal to or more than the lower limit value, the weight reduction effect and so on exerted by the hollow particles are excellent. The upper limit of the void ratio of the hollow particles of the present disclosure is not particularly limited. From the viewpoint of suppressing a decrease in the strength of the hollow particles and making the hollow particles less likely to collapse, the upper limit is preferably 90% or less, more preferably 85% or less, and still more preferably 80% or less.

The void ratio of the hollow particles of the present disclosure is calculated from the apparent density $D_1$ and true density $D_0$ of the hollow particles.

A method for measuring the apparent density $D_1$ of the hollow particles is as follows. First, approximately 30 cm$^3$ of the hollow particles are introduced into a measuring flask with a volume of 100 cm$^3$, and the mass of the introduced hollow particles is precisely weighed. Next, the measuring flask in which the hollow particles are introduced, is precisely filled with isopropanol up to the marked line while care is taken so that air bubbles do not get in. The mass of the isopropanol added to the measuring flask is precisely weighed, and the apparent density $D_1$ (g/cm$^3$) of the hollow particles is calculated by the following formula (I).

$$\text{Apparent density } D_1 = [\text{Mass of the hollow particles}]/(100-[\text{Mass of the isopropanol}]/[\text{Specific gravity of the isopropanol at the measuring temperature}]) \qquad \text{Formula (I)}$$

The apparent density $D_1$ is equivalent to the specific gravity of the whole hollow particle in the case where the hollow portion is regarded as a part of the hollow particle.

A method for measuring the true density $D_0$ of the hollow particles is as follows. The hollow particles are pulverized in advance; approximately 10 g of the pulverized hollow particles are introduced into a measuring flask with a volume of 100 cm$^3$; and the mass of the introduced pulverized particles is precisely weighed. After that, similarly to the measurement of the apparent density mentioned above, isopropanol is added to the measuring flask; the mass of the isopropanol is precisely weighed; and the true density $D_0$ (g/cm$^3$) of the hollow particles is calculated by the following formula (II).

$$\text{True density } D_0 = [\text{Mass of the pulverized hollow particles}]/(100-[\text{Mass of the isopropanol}]/[\text{Specific gravity of the isopropanol at the measuring temperature}]) \qquad \text{Formula (II)}$$

The true density $D_0$ is equivalent to the specific gravity of the shell portion alone of the hollow particle. As is clear from the measurement method mentioned above, when calculating the true density $D_0$, the hollow portion is not regarded as a part of the hollow particle.

The void ratio (%) of the hollow particles is calculated by the following formula (III) from the apparent density $D_1$ and the true density $D_0$.

$$\text{Void ratio (\%)} = 100 - (\text{Apparent density } D_1/\text{True density } D_0) \times 100 \qquad \text{Formula (III)}$$

The volume average particle diameter of the hollow particles of the present disclosure is preferably from 1.0 μm to 80 μm. When the volume average particle diameter of the hollow particles is equal to or more than the lower limit value, the aggregability of the hollow particles decreases, and the hollow particles exert excellent dispersibility, accordingly. On the other hand, when the volume average particle diameter of the hollow particles is equal to or less than the upper limit value, a decrease in the strength of the hollow particles is suppressed. In addition, since the hollow particles easily get between the reinforcing fibers, they are easily uniformly dispersed in the molded body.

In the present disclosure, the lower limit of the volume average particle diameter of the hollow particles is more preferably 3.0 μm or more, still more preferably 5.0 μm or more, and even more preferably 7.0 μm or more. In the present disclosure, the upper limit of the volume average particle diameter of the hollow particles is more preferably 30.0 μm or less, still more preferably 20.0 μm or less, and even more preferably 10.0 μm or less.

The particle size distribution (volume average particle diameter (Dv)/number average particle diameter (Dn)) of the hollow particles may be 1.05 or more and 2.5 or less, for example. When the particle size distribution is 2.5 or less, hollow particles such that properties such as pressure resistance and heat resistance slightly vary between the hollow particles, can be obtained. When the particle size distribution is 2.5 or less, a product having uniform thickness can be produced in the case of producing a molded body in a sheet form, for example.

The volume average particle diameter (Dv) and number average particle diameter (Dn) of the hollow particles can be found as follows, for example. The particle diameter of each of the hollow particles is measured with a laser diffraction particle size distribution measuring apparatus; the number average and volume average of the particle diameters are calculated; and the obtained values can be used as the number average particle diameter (Dn) and volume average particle diameter (Dv) of the hollow particles. The particle size distribution is found by dividing the volume average particle diameter by the number average particle diameter.

The shape of the hollow particles of the present disclosure is not particularly limited, as long as the hollow portion is formed in the interior. As the shape, examples include, but are not limited to, a spherical shape, an ellipsoidal shape and an irregular shape. Among them, a spherical shape is preferable in terms of ease of production and excellent strength and pressure resistance of the hollow particles.

The hollow particles may have one or two or more hollow portions. The shell of the hollow particles and, when the hollow particles have two or more hollow portions, a partition separating the adjacent hollow portions from each other may be porous. The interior of the particles preferably has only one hollow portion in order to maintain good balance between the high void ratio of the hollow particles and the mechanical strength of the hollow particles.

The average circularity of the hollow particles may be from 0.950 to 0.995.

An example of the image of the shape of the hollow particles is a bag made of a thin film and inflated with gas. A cross-section of the bag is like the hollow particle 100 shown in the diagram (5) of FIG. 1 described below. In this example, one thin film is provided on the outside, and the interior is filled with gas.

The shape of the particles can be determined by SEM or TEM, for example. Further, the shape of the interior of the particles can be determined by SEM or TEM after cutting the particles into round slices by a known method.

The shell of the hollow particles of the present disclosure contains, as the resin, a polymer in which 80 parts by mass or more of a crosslinkable monomer unit is contained in 100 parts by mass of all monomer units. The polymer forms the framework of the shell of the hollow particles. Since the shell contains the crosslinkable monomer unit in the above amount, the covalent bond network is tightly strung in the shell of the hollow particles of the present disclosure.

In the polymer, the content of the crosslinkable monomer unit in 100 parts by mass of all monomer units, is preferably 85 parts by mass or more, and more preferably 90 parts by mass or more, from the viewpoint of increasing the strength and solvent resistance of the hollow particles and improving the weight reduction effect and so on exerted by the hollow particles. The upper limit of the content of the crosslinkable monomer unit is not particularly limited, and it may be 100 parts by mass or less. From the viewpoint of sufficiently containing the below-described hydrophilic non-crosslinkable monomer unit, the upper limit of the content of the crosslinkable monomer unit is preferably 98 parts by mass or less, and more preferably 97 parts by mass or less.

In the present disclosure, the crosslinkable monomer unit is a monomer unit derived from the crosslinkable monomer. In the polymer, when the content of the crosslinkable monomer unit is less than 100 parts by mass, the monomer unit other than the crosslinkable monomer unit is a non-crosslinkable monomer unit derived from the non-crosslinkable monomer.

The polymer is typically a polymer of the first and second polymerizable monomers obtained by the first and second polymerization reactions in the below-described method for producing the hollow particles of the present disclosure. That is, in the hollow particles of the present disclosure, the crosslinkable and non-crosslinkable monomer units contained in the polymer generally originate from the first and second polymerizable monomers described below.

The specific details of the crosslinkable and non-crosslinkable monomers used for synthesis of the polymer are as described below in the method for producing the hollow particles of the present disclosure.

As the crosslinkable monomer unit, the polymer contains at least one selected from a bifunctional crosslinkable monomer unit derived from a bifunctional crosslinkable monomer and a trifunctional or higher-functional crosslinkable monomer unit derived from a trifunctional or higher-functional crosslinkable monomer. From the viewpoint of increasing the strength and solvent resistance of the hollow particles and improving the weight reduction effect and so on exerted by the hollow particles, the polymer preferably contains at least the bifunctional crosslinkable monomer unit. From the viewpoint of further increasing the strength of the hollow particles, the polymer more preferably contains the bifunctional crosslinkable monomer unit in combination with the trifunctional or higher-functional crosslinkable monomer unit.

In the present disclosure, the crosslinkable monomer unit derived from a bifunctional crosslinkable monomer may be referred to as a "bifunctional crosslinkable monomer unit", and the crosslinkable monomer unit derived from a trifunctional or higher-functional crosslinkable monomer may be referred to as a "trifunctional or higher-functional crosslinkable monomer unit".

When the polymer contains the bifunctional crosslinkable monomer unit, the content of the bifunctional crosslinkable monomer unit in 100 parts by mass of all monomer units of the polymer, is not particularly limited. The lower limit is preferably 65 parts by mass or more, more preferably 70 parts by mass or more, and still more preferably 75 parts by mass or more, from the viewpoint of increasing the strength and solvent resistance of the hollow particles and improving the weight reduction effect and so on exerted by the hollow particles. On the other hand, the upper limit may be 100 parts by mass or less. From the viewpoint of sufficiently containing the trifunctional or higher-functional crosslinkable monomer unit or the below-described hydrophilic non-crosslinkable monomer unit, the upper limit is preferably 98 parts by mass or less, more preferably 95 parts by mass or less, and still more preferably 90 parts by mass or less.

When the polymer contains the trifunctional or higher-functional crosslinkable monomer unit, the content of the trifunctional or higher-functional crosslinkable monomer unit in 100 parts by mass of all monomer units of the polymer, is not particularly limited. The lower limit is preferably 5 parts by mass or more, more preferably 10 parts by mass or more, and still more preferably 15 parts by mass or more, from the viewpoint of increasing the strength and solvent resistance of the hollow particles and improving the weight reduction effect and so on exerted by the hollow particles. On the other hand, the upper limit is preferably 50 parts by mass or less, and more preferably 40 parts by mass or less. From the viewpoint of sufficiently containing the bifunctional crosslinkable monomer unit or the below-described hydrophilic non-crosslinkable monomer unit, the upper limit is still more preferably 30 parts by mass or less, and even more preferably 25 parts by mass or less.

The crosslinkable monomer unit contained in the polymer may contain a crosslinkable monomer unit derived from a (meth)acrylic crosslinkable monomer containing, as a polymerizable functional group, a (meth)acryloyl group. Accordingly, the hollow particles of the present disclosure can be hollow particles excellent in strength and heat resistance.

When the polymer contains a crosslinkable monomer unit derived from a (meth)acrylic crosslinkable monomer, the content of the crosslinkable monomer unit derived from a (meth)acrylic crosslinkable monomer is, in 100 parts by mass of the crosslinkable monomer unit, preferably 50 parts by mass or more, more preferably 70 parts by mass or more, and still more preferably 90 parts by mass or more, or the crosslinkable monomer unit may be composed of a (meth) acrylic crosslinkable monomer unit.

The specific details of the (meth)acrylic crosslinkable monomer are as described below in the method for producing the hollow particles of the present disclosure.

The polymer preferably further contains a non-crosslinkable monomer unit; the polymer more preferably contains the hydrophilic non-crosslinkable monomer unit having a solubility of 0.3 g/L or more in distilled water at 20° C.; and the polymer particularly preferably contains a hydrophilic non-crosslinkable monomer unit derived from the second polymerizable monomer described below. When the polymer contains the crosslinkable monomer unit in combination with the non-crosslinkable monomer unit, the mechanical properties of the shell of the hollow particles improve. Especially when the polymer contains the hydrophilic non-crosslinkable monomer unit as the non-crosslinkable monomer unit, the structure of the shell is likely to be dense. Accordingly, the strength and solvent resistance of the hollow particles are likely to increase and, as a result, the weight reduction effect and so on exerted by the hollow particles are likely to improve.

In 100 parts by mass of all monomer units of the polymer, the content of the non-crosslinkable monomer unit is from 0 part by mass to 20 parts by mass. From the viewpoint of increasing the strength of the hollow particles, the lower limit is preferably 2 parts by mass or more, more preferably 3 parts by mass or more, and still more preferably 4 parts by mass or more. The upper limit is preferably 15 parts by mass or less, more preferably 12 parts by mass or less, and still more preferably 10 parts by mass or less.

In 100 parts by mass of all monomer units of the polymer, the lower limit of the content of the hydrophilic non-crosslinkable monomer unit is preferably 2 parts by mass or more, more preferably 3 parts by mass or more, and still more preferably 4 parts by mass or more, and the upper limit is preferably 20 parts by mass or less, more preferably 15 parts by mass or less, still more preferably 12 parts by mass or less, and even more preferably 10 parts by mass or less, from the viewpoint of increasing the strength and solvent resistance of the hollow particles and improving the weight reduction effect and so on exerted by the hollow particles.

In 100% by mass of all the solid content of the shell of the hollow particles of the present disclosure, the content of the polymer is preferably 90% by mass or more, and more preferably 95% by mass or more. By controlling the content of the polymer to the lower limit value or more, the strength of the hollow particles can be increased.

In the hollow particle immersion test in which the mixture obtained by adding 0.1 mg of the hollow particles of the present disclosure to 4 mL of acetone and shaking them for 10 minutes at a shaking rate of 100 rpm, is left to stand for 48 hours in the environment at 25° C., less than 5% by mass of the hollow particles submerge in the acetone. The amount of the hollow particles submerged in the acetone in the immersion test, serves as an index of the density of the shell of the hollow particles. It is presumed that as the amount of the hollow particles submerged in the acetone in the immersion test decreases, the density of the shell of the hollow particles increases.

For example, to control the hollow particles submerged in the acetone to less than 5% by mass in the immersion test, the hollow particles are produced by the following method so that the content of the crosslinkable monomer unit in the shell-forming polymer is 80% by mass or more: during the polymerization reaction of the suspension, when the polymerization conversion rate of the first polymerizable monomer containing a specific amount or more of the crosslinkable monomer reaches 93% by mass or more, the second polymerizable monomer, which is a hydrophilic monomer, is added to the suspension, and the suspension is further subjected to a polymerization reaction. This production method is the below-described method for producing the hollow particles of the present disclosure.

In SEM observation of the hollow particles of the present disclosure, the number of the hollow particles having a communication hole or shell defect is preferably 5 or less per 100 of the hollow particles.

In general, there are hollow particles in which the shell does not have a communication hole communicating between the hollow portion and the external space of the particles, and hollow particles in which the shell has one or two or more communication holes and the hollow portion communicates with the outside of the particles via the communication holes. In general, depending on the size of the hollow particles, the diameter of the communication hole is approximately from 10 nm to 500 nm. While the communication hole imparts beneficial functions to the hollow particles, since the communication hole is a defect portion of the shell, it decreases the strength of the hollow particles and easily causes the collapse of the hollow particles.

Also, the hollow particles may have a crack-shaped shell defect which is extremely large relative to the size of the hollow particles. In general, depending on the size of the hollow particles, a crack having a length of 1 μm or more extremely deteriorates the strength of hollow particles. Accordingly, it is recognized as a shell defect.

In the hollow particle immersion test, when less than 5% by mass of the hollow particles submerge in the acetone, the number of the hollow particles having a communication hole or shell defect can be considered to be 5 or less per 100 of the hollow particles. Even when the shell does not have a communication hole or a shell defect, there is a possibility that 5% by mass or more of the hollow particles submerge in the hollow particle immersion test. Accordingly, the case where less than 5% by mass of the hollow particles submerge in the hollow particle immersion test, is considered to mean that the communication holes and shell defects of the shell are very few, and the shell has a dense crosslinked structure.

The content of the hollow particles in the fiber-reinforced molded body of the present disclosure, is not particularly limited. The lower limit of the mass-based content of the hollow particles is preferably 5% by mass or more, and more preferably 10% by mass or more. On the other hand, the upper limit of the mass-based content of the hollow particles is preferably 50% by mass or less, more preferably 40% by mass or less, still more preferably 30% by mass or less, and even more preferably 20% by mass or less.

The lower limit of the volume-based content of the hollow particles in the fiber-reinforced molded body of the present disclosure, is preferably 15% by volume or more, more preferably 25% by volume or more, and still more preferably 30% by volume or more. On the other hand, the upper limit of the volume-based content of the hollow particles is preferably 60% by volume or less, more preferably 50% by volume or less, and still more preferably 40% by volume or less.

By controlling the content of the hollow particles to the lower limit value or more, the effect of reducing the weight of the fiber-reinforced molded body can be improved. By controlling the content of the hollow particles to the upper limit value or less, a deterioration in the properties of the fiber-reinforced molded body can be suppressed.

The mass-based content of the hollow particles in the fiber-reinforced molded body can be obtained as follows. First, from the mass of the fiber-reinforced molded body and the mass of the reinforcing fibers in the fiber-reinforced molded body, the content (% by mass) of the resin in the fiber-reinforced molded body is calculated by the following formula (1). Next, from the content (% by mass) of the resin and from the content (% by mass) of the hollow particles in the solid content of the resin composition applied to the reinforcing fibers, the mass-based content (% by mass) of the hollow particles can be calculated by the following formula (2).

The "resin in the fiber-reinforced molded body" means, among the materials constituting the fiber-reinforced molded body, the total of the materials other than the reinforcing fibers. Typically, it is the total of the matrix resin and hollow particles in the fiber-reinforced molded body.

The fiber-reinforced molded body used to obtain the mass-based content of the hollow particles, is required to be a fiber-reinforced molded body from which the solvent has been removed. Using an intermediate product such as a prepreg, the content of the hollow particles contained in the finished product obtained by curing the prepreg, can be obtained.

$$\text{Content (\% by mass) of the resin} = \{([\text{Mass of the fiber-reinforced molded body}] - [\text{Mass of the reinforcing fibers}])/[\text{Mass of the fiber-reinforced molded body}]\} \times 100 \qquad \text{Formula (1)}$$

$$\text{Content (\% by mass) of the hollow particles} = [\text{Content (\% by mass) of the resin}] \times [\text{Content (\% by mass) of the hollow particles in the solid content of the resin composition applied to the reinforcing fibers}]/100 \qquad \text{Formula (2)}$$

The volume-based content of the hollow particles in the fiber-reinforced molded body can be calculated as follows, for example. First, the volumes of the hollow particles, matrix resin and reinforcing fibers constituting the fiber-reinforced molded body, are obtained by the following formulae (3), (4) and (5). Next, using the obtained values, the volume-based content of the hollow particles can be calculated by the following formula (6).

$$\text{Volume of the hollow particles} = [\text{Content (\% by mass) of the hollow particles}]/[\text{Specific gravity (g/cm}^3) \text{ of the hollow particles}] \qquad \text{Formula (3)}$$

$$\text{Volume of the matrix resin} = [\text{Content (\% by mass) of the matrix resin}]/[\text{Specific gravity (g/cm}^3) \text{ of the cured matrix resin}] \qquad \text{Formula (4)}$$

$$\text{Volume of the reinforcing fibers} = [\text{Content (\% by mass) of the reinforcing fibers}]/[\text{Specific gravity (g/cm}^3) \text{ of the reinforcing fibers}] \qquad \text{Formula (5)}$$

$$\text{Content (\% by volume) of the hollow particles} = \{[\text{Volume of the hollow particles}]/([\text{Volume of the hollow particles}] + [\text{Volume of the matrix resin}] + [\text{Volume of the reinforcing fibers}])\} \times 100 \qquad \text{Formula (6)}$$

The "content (% by mass) of the hollow particles" used in the formula (3) is the value obtained by the formula (2).

The "content (% by mass) of the matrix resin" used in the formula (4) can be calculated by the following formula (7).

$$\text{Content (\% by mass) of the matrix resin} = [\text{Content (\% by mass) of the resin}] \times [\text{Content (\% by mass) of the matrix resin in the solid content of the resin composition applied to the reinforcing fibers}]/100 \qquad \text{Formula (7)}$$

In the formula (7), the content (% by mass) of the resin is the value obtained by the formula (1).

The "specific gravity (g/cm$^3$) of the cured matrix resin" used in the formula (4) can be the value of the true density of the cured product of a composition obtained by removing the hollow resin particles from the resin composition to be applied to the reinforcing fibers. The true density of the composition is obtained by the same method as for the hollow particles.

The "content (% by mass) of the reinforcing fibers" used in the formula (5) can be calculated by the following formula (8).

$$\text{Content (\% by mass) of the reinforcing fibers} = \{[\text{Mass of the reinforcing fibers}]/[\text{Mass of the fiber-reinforced molded body}]\} \times 100 \qquad \text{Formula (8)}$$

I-2. Matrix Resin

The matrix resin used in the present disclosure may be a resin that is generally used as the matrix resin of fiber-reinforced molded bodies, and it may be a thermoplastic resin, a thermosetting resin or a room temperature curable resin.

The fiber-reinforced molded body of the present disclosure can be produced by the following wet method, for example: the reinforcing fibers is immersed in the resin composition containing the matrix resin, the hollow particles and the solvent, and the solvent is removed from the reinforcing fibers, thereby producing the fiber-reinforced molded body of the present disclosure. When the matrix resin contains a thermoplastic resin, the fiber-reinforced molded body of the present disclosure can be produced by the following hot-melt method, for example: the viscosity of the resin composition containing the matrix resin and the hollow particles is decreased by heating, and the reinforcing fibers are impregnated with the low-viscosity resin composition, thereby producing the fiber-reinforced molded body of the present disclosure, or the resin composition containing the matrix resin and the hollow particles is molded into a sheet form, and the sheet is disposed on one or both surfaces of the reinforcing fibers, and they are hot pressed to impregnate the reinforcing fibers with the resin composition, thereby producing the fiber-reinforced molded body of the present disclosure.

From the point of view that the weight reduction effect and so on can be easily exerted by the hollow particles used in the present disclosure, a resin that is applicable to the above-described wet method is preferably used as the matrix resin. For example, the matrix resin preferably contains a thermosetting resin.

As the thermoplastic resin that can be used as the matrix resin, examples include, but are not limited to, polyolefin (such as polypropylene and polyethylene), polyamide (such as PA6, PA66 and PA12), polyimide, polyamideimide, polyetherimide, polyetherketoneketone, polyvinyl chloride, polystyrene, poly(meth)acrylate, polycarbonate, polyvinylidene fluoride, acrylonitrile-butadiene-styrene copolymer (ABS), acrylonitrile-styrene copolymer (AS), polyphenylene ether, polyphenylene sulfide, polyester, polytetrafluoroethylene and thermoplastic elastomer. These thermoplastic resins may be used alone or in combination of two or more.

As the thermosetting resin that can be used as the matrix resin, examples include, but are not limited to, phenol-based resin, melamine-based resin, urea-based resin, unsaturated polyester-based resin, epoxy-based resin, polyurethane-based resin, silicon-based resin, alkyd-based resin, thermosetting polyphenylene ether-based resin, thermosetting polyimide-based resin, benzoxazine-based resin, allyl-based resin, aniline-based resin, maleimide-based resin, bismaleimide triazine-based resin, liquid crystalline polyester-based resin, vinyl ester-based resin, unsaturated polyester-based resin, cyanate ester-based resin, and polyetherimide resin. These thermosetting resins may be used alone or in combination of two or more.

As the room temperature curable resin that can be used as the matrix resin, examples include, but are not limited to, epoxy-based resin and urethane-based resin. These room temperature curable resins may be used alone or in combination of two or more.

As needed, the matrix resin may contain a resin curing additive such as a curing agent, a curing catalyst and a curing accelerator. The details of the resin curing additives are as described below under "II. Method for producing fiber-reinforced molded body".

The content of the matrix resin in the fiber-reinforced molded body of the present disclosure is not particularly limited. From the viewpoint of mechanical properties, with respect to the total (100 parts by mass) of the matrix resin and hollow particles in the fiber-reinforced molded body, the content of the matrix resin is preferably 50 parts by mass or more, and more preferably 70 parts by mass or more. From the viewpoint of weight reduction, the content of the matrix resin is preferably 95 parts by mass or less, more preferably 90 parts by mass or less, and still more preferably 85 parts by mass or less.

In the present disclosure, the content of the matrix resin also includes the content of the resin curing additive such as a curing agent, a curing catalyst and a curing accelerator.

I-3. Reinforcing Fibers

The reinforcing fibers used in the present disclosure may be reinforcing fibers that are generally used in fiber-reinforced molded bodies, and they are not particularly limited. As the reinforcing fibers, examples include, but are not limited to, organic and inorganic reinforcing fibers such as carbon fibers, glass fibers, aramid fibers, alumina fibers, boron fibers, Tyranno fibers and SiC fibers. From the viewpoint of excellent mechanical properties, thermal oxidation resistance, dimensional stability and so on, carbon fibers are preferred.

The form of the reinforcing fibers is not particularly limited. For example, the reinforcing fibers processed in a fabric form, a non-woven fabric form, a mat form or the like may be used. The reinforcing fibers may be long or short fibers.

The content of the reinforcing fibers in the fiber-reinforced molded body of the present disclosure is not particularly limited. With respect to 100% by mass of the fiber-reinforced molded body of the present disclosure, the content of the reinforcing fibers is preferably from 20% by mass to 80% by mass. When the content of the reinforcing fibers is in the range, the fiber-reinforced molded body can be a fiber-reinforced molded body excellent in fatigue strength and impact properties.

In addition to the above-described hollow particles, matrix resin and reinforcing fibers, the fiber-reinforced molded body of the present disclosure may further contain additives as needed, such as an inorganic filler, an antioxidant, a thermal stabilizer, a UV absorber, a light stabilizer, a lubricant, a flame retardant, a release agent, an antistatic agent and a colorant, to the extent that does not impair the effects of the present disclosure.

I-4. Properties of Fiber-Reinforced Molded Body

The properties of the fiber-reinforced molded body of the present disclosure can be determined depending on the intended application, by appropriately selecting the type and amount of the added components described above.

The tensile elastic modulus of the fiber-reinforced molded body of the present disclosure is not particularly limited. The lower limit of the tensile elastic modulus is preferably 13 GPa or more, and more preferably 14 GPa or more. The upper limit is preferably 20 GPa or less, and more preferably 18 GPa or less.

The tensile strength of the fiber-reinforced molded body of the present disclosure is not particularly limited. The lower limit of the tensile strength is preferably 350 MPa or more, and more preferably 400 MPa or more. The upper limit is preferably 500 MPa or less, and more preferably 450 MPa.

In the present disclosure, the tensile elastic modulus and tensile strength of the fiber-reinforced molded body are measured in accordance with JIS K 7165:2008.

The form of the fiber-reinforced molded body of the present disclosure is not particularly limited and may be any kind of form that can be formed. The fiber-reinforced molded body can be in any form such as a sheet form, a film form, a plate form, a tube form, and various kinds of other three-dimensional forms.

I-5. Applications of Fiber-Reinforced Molded Body

The applications of the fiber-reinforced molded body of the present application are not particularly limited. For example, the fiber-reinforced molded body of the present application is suitably used in various kinds of components required to have mechanical properties and weight reduction, in various kinds of fields such as the automotive, bicycle, aviation, space, rail vehicle, vessel, architecture, electronic, electric and sporting goods fields.

II. Method for Producing Fiber-Reinforced Molded Body

The method for producing the fiber-reinforced molded body of the present disclosure is a method for producing a fiber-reinforced molded body comprising a matrix resin, reinforcing fibers and hollow particles, the method comprising:

producing hollow particles, preparing a resin composition containing the hollow particles thus obtained, the matrix resin and the solvent, and impregnating the reinforcing fibers with the resin com-
position,
wherein a method for producing the hollow particles
comprises:
preparing a mixture liquid containing a first polymeriz-
able monomer, a hydrocarbon solvent, a dispersion
stabilizer and an aqueous medium,
suspending the mixture liquid to prepare a suspension in
which droplets of a monomer composition containing
the first polymerizable monomer and the hydrocarbon
solvent are dispersed in the aqueous medium, and
subjecting the suspension to a polymerization reaction;
wherein the mixture liquid contains a crosslinkable mono-
mer as the first polymerizable monomer, and a content
of the crosslinkable monomer in 100 parts by mass of
the first polymerizable monomer is 80 parts by mass or
more; and
wherein, during subjecting the suspension to the polym-
erization reaction, when a polymerization conversion
rate of the first polymerizable monomer reaches 93%
by mass or more, a second polymerizable monomer
having a solubility of 0.3 g/L or more in distilled water
at 20° C., is added to the suspension, and the suspen-
sion is further subjected to a polymerization reaction.
The method for producing the fiber-reinforced molded
body of the present disclosure includes the steps of produc-
ing the hollow particles, preparing the resin composition and
impregnating the reinforcing fibers with the resin composi-
tion. In addition to them, the production method may further
include other steps. In the production method of the present
disclosure, as far as technically possible, two or more of the
above steps may be simultaneously carried out as one step,
or their order may be changed and then they may be carried
out in that order.

II-1. Step of Producing Hollow Particles

The hollow particles used in the present disclosure can be
obtained by the method for producing hollow particles, the
method comprising:
preparing a mixture liquid containing a first polymeriz-
able monomer, a hydrocarbon solvent, a dispersion
stabilizer and an aqueous medium,
suspending the mixture liquid to prepare a suspension in
which droplets of a monomer composition containing
the first polymerizable monomer and the hydrocarbon
solvent are dispersed in the aqueous medium, and
subjecting the suspension to a polymerization reaction;
wherein the mixture liquid contains a crosslinkable mono-
mer as the first polymerizable monomer, and a content
of the crosslinkable monomer in 100 parts by mass of
the first polymerizable monomer is 80 parts by mass or
more; and
wherein, during subjecting the suspension to the polym-
erization reaction, when a polymerization conversion
rate of the first polymerizable monomer reaches 93%
by mass or more, a second polymerizable monomer
having a solubility of 0.3 g/L or more in distilled water
at 20° C., is added to the suspension, and the suspen-
sion is further subjected to a polymerization reaction.
The above-mentioned method for producing the hollow
particles follows the following basic technique: by carrying
out the suspension treatment of the mixture liquid containing
the first polymerizable monomer, the hydrocarbon solvent,
the dispersion stabilizer, and the aqueous medium, phase
separation is caused between the first polymerizable mono-
mer and the hydrocarbon solvent. Accordingly, the suspen-
sion in which droplets are dispersed in the aqueous medium,
and the droplets having a distribution structure such that the first polymerizable monomer is distributed on the surface
side and the hydrocarbon solvent is distributed in the center,
is prepared. By subjecting the suspension to a polymeriza-
tion reaction, the surface of the droplets is cured to form the
hollow particles having the hollow portion filled with the
hydrocarbon solvent.

According to this basic technique, during the polymer-
ization reaction of the suspension, when the polymerization
conversion rate of the first polymerizable monomer contain-
ing the crosslinkable monomer reaches 93% by mass or
more, the second polymerizable monomer, which is a hydro-
philic monomer having a solubility that is equal to or more
than the above-specified value in distilled water at 20° C., is
added to the suspension, and the suspension is further
subjected to a polymerization reaction. Accordingly, such
hollow particles are produced, that in the hollow particle
immersion test, less than 5% by mass of the hollow particles
submerge in the acetone. When the crosslinkable monomer
is used as a polymerizable monomer that is used to form the
shell of the hollow particles, unreacted polymerizable func-
tional groups are likely to remain in the shell. As the number
of the polymerizable functional groups remaining unreacted
in the shell increases, the crosslinked structure of the shell
becomes looser. Accordingly, it is presumed that because the
unreacted polymerizable functional groups remain in the
hollow particles obtained by the conventional production
method, 5% by mass or more of the hollow particles
submerge in the acetone in the hollow particle immersion
test.

In the above-mentioned method for producing the hollow
particles, the reaction rate of the whole polymerizable mono-
mers including the first and second polymerizable mono-
mers, is considered to be increased by the following polym-
erization reaction of the suspension: the suspension in which
the droplets of the monomer composition containing the first
polymerizable monomer are dispersed in the aqueous
medium, the first polymerizable monomer containing a large
amount of the crosslinkable monomer, is subjected to the
first polymerization reaction until the polymerization con-
version rate of the first polymerizable monomer reaches
93% by mass or more; then, the second polymerizable
monomer which is a hydrophilic monomer, is added to the
suspension; and the suspension is further subjected to the
second polymerization reaction.

In the present disclosure, the particles having the hollow
portion filled with the hydrocarbon solvent and the shell
containing the polymer of the first polymerizable monomer
obtained by the first polymerization reaction, may be
referred to as the "first precursor particles", and the com-
position containing the first precursor particles may be
referred to as the "first precursor composition". Also in the
present disclosure, the particles having the hollow portion
filled with the hydrocarbon solvent and the shell containing
the polymer of the first and second polymerizable mono-
mers, may be considered as the intermediate of the hollow
particles in which the hollow portion is filled with gas, and
they may be referred to as the "second precursor particles".
The composition containing the second precursor particles
may be referred to as the "second precursor composition".

In the method for producing the hollow particles, the
second polymerizable monomer is likely to be incorporated
into the shell of the first precursor particles when added to
the first precursor composition, because the solubility of the
second polymerizable monomer in distilled water at 20° C.
is equal to or more than the above-specified value. The
second polymerizable monomer is considered to be incor-
porated into the shell formed by the first polymerizable monomer and accelerate the thermal motion of the shell when added to the first precursor composition, because the second polymerizable monomer is a hydrophilic monomer and has affinity for both the first polymerizable monomer and the aqueous medium. The reason for the formation of the shell that is less permeable to acetone, is presumed as follows. In the second polymerization reaction, the polymerization reaction progresses while the thermal motion of the shell is accelerated in the state where the second polymerizable monomer is incorporated in the shell formed by the first polymerizable monomer. Accordingly, the reaction rate is high; the polymerization reaction of the second polymerizable monomer incorporated in the shell and the polymerizable functional groups of the first polymerizable monomer remaining unreacted in the shell, sufficiently progress; and the crosslinked structure is densified.

The method for producing the hollow particles includes the steps of preparing the mixture liquid, preparing the suspension, and subjecting the suspension to the polymerization reaction. The method may further include other steps. As far as technically possible, two or more of the above steps and other additional steps may be simultaneously carried out as one step, or their order may be changed and then they may be carried out in that order. For example, the preparation and suspension of the mixture liquid may be simultaneously carried out in one step (e.g., the mixture liquid may be suspended while adding the materials for the mixture liquid).

A preferred embodiment of the method for producing the hollow particles may be a production method including the following steps.

(1) Mixture Liquid Preparation Step

The mixture liquid preparation step includes preparing the mixture liquid containing the first polymerizable monomer, the hydrocarbon solvent, the dispersion stabilizer, and the aqueous medium.

(2) Suspension Step

The suspension step includes suspending the mixture liquid to prepare the suspension in which the droplets of the monomer composition containing the first polymerizable monomer and the hydrocarbon solvent are dispersed in the aqueous medium.

(3) Polymerization Step (3-1) First Polymerization Step

The first polymerization step includes performing the first polymerization reaction by subjecting the suspension to a polymerization reaction, until the polymerization conversion rate of the first polymerizable monomer reaches 93% by mass or more to prepare the first precursor composition containing the first precursor particles that have the shell containing the polymer of the first polymerizable monomer and the hollow portion filled with the hydrocarbon solvent.

(3-2) Second Polymerization Step

The second polymerization step includes performing the second polymerization reaction by adding, to the first precursor composition, the second polymerizable monomer having a solubility of 0.3 g/L or more in distilled water at 20° C. and subjecting the composition to the polymerization reaction to prepare the second precursor composition containing the second precursor particles that have the shell containing the polymer of the first and second polymerizable monomers and the hollow portion filled with the hydrocarbon solvent.

(4) Solid-Liquid Separation Step

The solid-liquid separation step includes carrying out solid-liquid separation of the second precursor composition to obtain the second precursor particles including the hydrocarbon solvent in the hollow portion.

(5) Solvent Removal Step

The solvent removal step includes removing the hydrocarbon solvent from the second precursor particles obtained by the solid-liquid separation step to obtain the hollow particles.

FIG. 1 is a schematic diagram showing an example of the production method described above. The diagrams (1) to (5) in FIG. 1 correspond to the steps (1) to (5) described above, respectively. White arrows between the diagrams indicate the order of the steps. FIG. 1 is merely a schematic diagram for description, and the above-described production method is not limited to the method shown in FIG. 1. Further, the structures, dimensions and shapes of materials used for the production method of the present disclosure are not limited to the structures, dimensions and shapes of various materials shown in these diagrams.

The diagram (1) of FIG. 1 is a schematic cross-sectional view showing an embodiment of the mixture liquid in the mixture liquid preparation step. As shown in the diagram, the mixture liquid contains an aqueous medium 1 and a low polarity material 2 dispersed in the aqueous medium 1. Here, the low polarity material 2 means a material that has low polarity and is less likely to mix with the aqueous medium 1. In the present disclosure, the low polarity material 2 contains the first polymerizable monomer and the hydrocarbon solvent.

The diagram (2) of FIG. 1 is a schematic cross-sectional view showing an embodiment of the suspension in the suspension step. The suspension contains the aqueous medium 1 and a droplet 10 of the monomer composition dispersed in the aqueous medium 1. The droplet 10 of the monomer composition contains the first polymerizable monomer and the hydrocarbon solvent, and their distribution in the droplet is not uniform. The droplet 10 of the monomer composition has the following structure: phase separation occurs between the hydrocarbon solvent (hydrocarbon solvent 4a) and a material 4b containing the first polymerizable monomer and not containing the hydrocarbon solvent; the hydrocarbon solvent 4a is distributed in the center; the material 4b not containing the hydrocarbon solvent is distributed on the surface side; and the dispersion stabilizer (not shown) is on the surface.

The diagram (3) of FIG. 1 is a schematic cross-sectional view showing an embodiment of the composition (the second precursor composition) which is obtained by the polymerization step and which contains the hollow particle (the second precursor particle) including the hydrocarbon solvent in the hollow portion. The composition contains the aqueous medium 1 and a hollow particle 20 (the second precursor particle) which is dispersed in the aqueous medium 1 and which includes the hydrocarbon solvent 4a in the hollow portion. A shell 6 forming the outer surface of the second precursor particle 20 is formed by polymerization of the first polymerizable monomer in the droplet 10 of the monomer composition and polymerization of the second polymerizable monomer added later.

The diagram (4) of FIG. 1 is a schematic cross-sectional view showing an embodiment of the hollow particle including the hydrocarbon solvent in the hollow portion (the second precursor particle) after the solid-liquid separation step. The diagram (4) of FIG. 1 shows a state where the aqueous medium 1 has been removed from the state shown in the diagram (3) of FIG. 1.

The diagram (5) of FIG. 1 is a schematic cross-sectional view showing an embodiment of the hollow particle after the solvent removal step. The diagram (5) of FIG. 1 shows a state where the hydrocarbon solvent 4a has been removed from the state shown in the diagram (4) of FIG. 1. By the removal of the hydrocarbon solvent from the hollow particle (the second precursor particle) including the hydrocarbon solvent in the hollow portion, a hollow particle 100 having a gas-filled hollow portion 8 in the interior of the shell 6, is obtained.

Hereinbelow, the five steps described above and other steps are described in order.

(1) Mixture Liquid Preparation Step

The mixture liquid preparation step includes preparing the mixture liquid containing the first polymerizable monomer, the hydrocarbon solvent, the dispersion stabilizer and the aqueous medium.

The mixture liquid preferably contains an oil-soluble polymerization initiator as a polymerization initiator. Also, the mixture liquid may further contain other materials such as a suspension stabilizer, to the extent that does not impair the effects of the present disclosure.

The materials for the mixture liquid will be described in the order of (A) the first polymerizable monomer, (B) the oil-soluble polymerization initiator, (C) the hydrocarbon solvent, (D) the dispersion stabilizer and (E) the aqueous medium.

(A) First Polymerizable Monomer

The first polymerizable monomer contains at least the crosslinkable monomer. It may further contain the non-crosslinkable monomer to the extent that does not impair the effects of the present disclosure.

From the point of view that the polymerization reaction is easily stabilized and hollow particles with high heat resistance are obtained, a (meth)acrylic polymerizable monomer containing a (meth)acryloyl group as a polymerizable functional group, is preferably used as the first polymerizable monomer.

[Crosslinkable Monomer]

Since the crosslinkable monomer has a plurality of polymerizable functional groups, they can link monomers and can increase the crosslinking density of the shell.

As the crosslinkable monomer, examples include, but are not limited to, a bifunctional crosslinkable monomer having two polymerizable functional groups, such as divinylbenzene, divinylbiphenyl, divinylnaphthalene, diallyl phthalate, diallylamine, allyl (meth)acrylate, vinyl (meth)acrylate, ethylene glycol di(meth)acrylate, diethylene glycol di(meth) acrylate, pentaerythritol di(meth)acrylate, tricyclodecane dimethanol di(meth)acrylate, and 2-hydroxy-3-(meth)acryloyloxypropyl (meth)acrylate, and trifunctional or higher-functional crosslinkable monomers having three or more polymerizable functional groups, such as trimethylolpropane tri(meth)acrylate, ditrimethylolpropane tetra(meth) acrylate, pentaerythritol tri(meth)acrylate, pentaerythritol tetra(meth)acrylate, dipentaerythritol hexa(meth)acrylate, dipentaerythritol poly(meth)acrylate, and ethoxylates thereof. These crosslinkable monomers may be used alone or in combination of two or more.

Of these crosslinkable monomers, examples of the hydrophilic crosslinkable monomer having a solubility of 0.3 g/L or more in distilled water at 20° C., include ethylene glycol dimethacrylate, diethylene glycol diacrylate, aryl methacrylate, vinyl methacrylate, 2-hydroxy-3-methacryloyloxypropyl acrylate and diallylamine.

The crosslinkable monomer contained in the first polymerizable monomer is not particularly limited. It may be a hydrophilic crosslinkable monomer having a solubility of 0.3 g/L or more in distilled water at 20° C., or it may be a non-hydrophilic crosslinkable monomer having a solubility of less than 0.3 g/L in distilled water at 20° C.

As the crosslinkable monomer, the first polymerizable monomer contains at least one selected from the bifunctional crosslinkable monomer and the trifunctional or higher-functional crosslinkable monomer. From the viewpoint of increasing the strength and solvent resistance of the hollow particles and improving the weight reduction effect and so on exerted by the hollow particles, the first polymerizable monomer more preferably contains a combination of the bifunctional crosslinkable monomer and the trifunctional or higher-functional crosslinkable monomer. A case in which the first polymerizable monomer contains the trifunctional or higher-functional crosslinkable monomer, is superior in that the covalent bond network can be more tightly strung in the shell; however, unreacted polymerizable functional groups tend to remain after the first polymerization reaction. In the above-described production method, even when the first polymerizable monomer contains the trifunctional or higher-functional crosslinkable monomer, the polymerization reaction of the unreacted polymerizable functional groups remaining after the first polymerization reaction, is likely to progress by the second polymerization reaction performed by adding the hydrophilic monomer as the second polymerizable monomer. Accordingly, when the first polymerizable monomer contains the trifunctional or higher-functional crosslinkable monomer, the crosslinked structure of the shell is more densified; the strength and solvent resistance of the hollow particles are increased; and the weight reduction effect and so on exerted by the hollow particles are improved, accordingly.

Also, the crosslinkable monomer contained in the first polymerizable monomer is preferably a (meth)acrylic crosslinkable monomer containing, as a polymerizable functional group, a (meth)acryloyl group, from the point of view that the polymerization reaction is easily stabilized, and hollow particles with high strength and high heat resistance are obtained.

More specifically, the bifunctional crosslinkable monomer used as the first polymerizable monomer is preferably a bifunctional (meth)acrylic crosslinkable monomer such as allyl (meth)acrylate, ethylene glycol di(meth)acrylate, diethylene glycol di(meth)acrylate and pentaerythritol di(meth) acrylate. Of them, ethylene glycol di(meth)acrylate and pentaerythritol di(meth)acrylate are more preferred.

The trifunctional or higher-functional crosslinkable monomer used as the first polymerizable monomer is preferably a trifunctional or higher-functional (meth)acrylic crosslinkable monomer such as trimethylolpropane tri(meth) acrylate, ditrimethylolpropane tetra(meth)acrylate, pentaerythritol tri(meth)acrylate, pentaerythritol tetra(meth) acrylate, dipentaerythritol hexa(meth)acrylate, dipentaerythritol poly(meth)acrylate and ethoxylates thereof. Of them, pentaerythritol tetra(meth)acrylate, trimethylolpropane tri(meth)acrylate, ethoxylated trimethylolpropane tri(meth)acrylate, ethoxylated pentaerythritol tetra (meth)acrylate, pentaerythritol tri(meth)acrylate and dipentaerythritol poly(meth)acrylate are more preferred, and trimethylolpropane tri(meth)acrylate and pentaerythritol tetra(meth)acrylate are still more preferred.

In the present disclosure, the (meth)acrylic crosslinkable monomer is only required to be a crosslinkable monomer having at least one (meth)acryloyl group as a polymerizable functional group, and the (meth)acrylic crosslinkable monomer is preferably such that all polymerizable functional groups thereof are (meth)acryloyl groups.

When the first polymerizable monomer contains the (meth)acrylic crosslinkable monomer, the content of the (meth)acrylic crosslinkable monomer in 100 parts by mass of the crosslinkable monomer contained in the first polymerizable monomer, is preferably 50 parts by mass or more, more preferably 70 parts by mass or more, and still more preferably 90 parts by mass or more. The crosslinkable monomer contained in the first polymerizable monomer may be composed of the (meth)acrylic crosslinkable monomer.

In 100 parts by mass of the first polymerizable monomer, the content of the crosslinkable monomer is preferably 80 parts by mass or more, more preferably from 85 parts by mass to 100 parts by mass, still more preferably from 90 parts by mass to 100 parts by mass, and even more preferably from 95 parts by mass to 100 parts by mass. When the content of the crosslinkable monomer is equal to or more than the lower limit value, the polymer contained in the formed shell easily becomes the polymer in which from 80 parts by mass to 100 parts by mass of the crosslinkable monomer unit is contained in 100 parts by mass of all monomer units. Moreover, since the content of the crosslinkable monomer unit in the shell of the hollow particles is large enough, the covalent bond network is tightly strung in the shell. As a result, the strength and solvent resistance of the hollow particles are increased, and the weight reduction effect and so on exerted by the hollow particles are improved, accordingly.

When the first polymerizable monomer contains the bifunctional crosslinkable monomer as the crosslinkable monomer, the content of the bifunctional crosslinkable monomer in 100 parts by mass of the first polymerizable monomer is not particularly limited. The lower limit is preferably 70 parts by mass or more, and more preferably 80 parts by mass or more, from the viewpoint of increasing the strength and solvent resistance of the hollow particles and improving the weight reduction effect and so on exerted by the hollow particles. On the other hand, the upper limit may be 100 parts by mass or less. From the viewpoint of sufficiently containing the trifunctional or higher-functional crosslinkable monomer unit, the upper limit is preferably 95 parts by mass or less, and more preferably 90 parts by mass or less.

When the first polymerizable monomer contains the trifunctional or higher-functional crosslinkable monomer as the crosslinkable monomer, the content of the trifunctional or higher-functional crosslinkable monomer in 100 parts by mass of the first polymerizable monomer, is not particularly limited. From the viewpoint of increasing the strength and solvent resistance of the hollow particles and improving the weight reduction effect and so on exerted by the hollow particles, the lower limit is preferably 5 parts by mass or more, more preferably 10 parts by mass or more, and still more preferably 15 parts by mass or more. The upper limit is preferably 50 parts by mass or less, and more preferably 40 parts by mass or less. From the viewpoint of sufficiently containing the bifunctional crosslinkable monomer, the upper limit is still more preferably 30 parts by mass or less, and even more preferably 25 parts by mass or less.

[Non-Crosslinkable Monomer]

The first polymerizable monomer may further contain a non-crosslinkable monomer.

As the non-crosslinkable monomer, a monovinyl monomer is preferably used. The monovinyl monomer is a compound having one polymerizable vinyl functional group. As the monovinyl monomer, examples include, but are not limited to, the following non-hydrophilic non-crosslinkable monomers and hydrophilic non-crosslinkable monomers:

non-hydrophilic non-crosslinkable monomers including a (meth)acrylic acid alkyl ester containing an alkyl group having 6 or more carbon atoms, such as 2-ethylhexyl (meth) acrylate and lauryl (meth)acrylate; an aromatic vinyl monomer such as styrene, vinyltoluene, α-methylstyrene, p-methylstyrene and halogenated styrene; a monoolefin monomer such as ethylene, propylene and butylene; a diene monomer such as butadiene and isoprene; a carboxylic acid vinyl ester monomer such as vinyl acetate; a vinyl halide monomer such as vinyl chloride; a vinylidene halide monomer such as vinylidene chloride; and vinylpyridine, and hydrophilic non-crosslinkable monomers including a (meth)acrylic acid alkyl ester containing an alkyl group having 1 to 5 carbon atoms, such as methyl (meth)acrylate, ethyl (meth)acrylate and butyl (meth)acrylate; a (meth)acrylamide such as (meth) acrylamide, N-methylol (meth)acrylamide and N-butoxymethyl (meth)acrylamide and derivatives thereof; (meth) acrylic acid nitrile and derivatives thereof; and polar group-containing non-crosslinkable monomers.

The polar group-containing non-crosslinkable monomer is preferably a non-crosslinkable monomer containing a polar group selected from a carboxyl group, a hydroxyl group, a sulfonic acid group, an amino group, a polyoxyethylene group and an epoxy group. As such a non-crosslinkable monomer, examples include, but are not limited to, a carboxyl group-containing monomer such as an ethylenically unsaturated carboxylic acid monomer such as (meth) acrylic acid, crotonic acid, cinnamic acid, itaconic acid, fumaric acid, maleic acid and butene tricarboxylic acid; a hydroxyl group-containing monomer such as 2-hydroxyethyl (meth)acrylate, 2-hydroxypropyl (meth)acrylate and 4-hydroxybutyl (meth)acrylate; a sulfonic acid group-containing monomer such as styrenesulfonic acid; an amino group-containing monomer such as dimethylaminoethyl (meth)acrylate and diethylaminoethyl (meth)acrylate; a polyoxyethylene group-containing monomer such as methoxypolyethylene glycol (meth)acrylate; and an epoxy group-containing monomer such as glycidyl (meth)acrylate, allyl glycidyl ether and 4-hydroxybutyl acrylate glycidyl ether.

These non-crosslinkable monomers may be used alone or in combination of two or more.

From the viewpoint of increasing the strength of the hollow particles, as the non-crosslinkable monomer used as the first polymerizable monomer, hydrophilic non-crosslinkable monomers are preferred; (meth)acrylic acid alkyl esters containing an alkyl group having 1 to 5 carbon atoms are more preferred; and (meth)acrylic acid alkyl esters containing an alkyl group having 1 to 4 carbon atoms are still more preferred.

In the first polymerizable monomer, the polymerizable monomer other than the crosslinkable monomer is the non-crosslinkable monomer. In 100 parts by mass of the first polymerizable monomer, the content of the non-crosslinkable monomer is preferably from 0 part by mass to 15 parts by mass. It is more preferably 10 parts by mass or less, and still more preferably 5 parts by mass or less, and the first polymerizable monomer is particularly preferably free of the non-crosslinkable monomer, from the following points of view: a decrease in the reactivity of the first polymerizable monomer is suppressed; the strength and solvent resistance of the hollow particles are increased; and the weight reduction effect and so on exerted by the hollow particles are improved.

The content of the first polymerizable monomer in the mixture liquid is not particularly limited. From the viewpoint of the balance of the void ratio, particle diameter and mechanical strength of the hollow particles, with respect to the total mass (100% by mass) of the components (except for the aqueous medium) in the mixture liquid, the content of the first polymerizable monomer is generally from 15% by mass to 55% by mass, and more preferably from 25% by mass to 40% by mass.

From the viewpoint of increasing the mechanical strength of the hollow particles, the content of the first polymerizable monomer is preferably 90% by mass or more, and more preferably 95% by mass or more, with respect to the total mass (100% by mass) of a solid component obtained by excluding the hydrocarbon solvent from the material for the oil phase in the mixture liquid.

(B) Oil-Soluble Polymerization Initiator

In the present disclosure, the mixture liquid preferably contains an oil-soluble polymerization initiator as the polymerization initiator. As the method for polymerizing the droplets of the monomer composition after suspending the mixture liquid, examples include an emulsion polymerization method using a water-soluble polymerization initiator and a suspension polymerization method using an oil-soluble polymerization initiator. By using the oil-soluble polymerization initiator, suspension polymerization can be performed.

The oil-soluble polymerization initiator is not particularly limited, as long as it is a lipophilic one having a solubility in water of 0.2% by mass or less. As the oil-soluble polymerization initiator, examples include, but are not limited to, benzoyl peroxide, lauroyl peroxide, t-butyl peroxy-2-ethylhexanoate, 2,2'-azobis(2,4-dimethylvaleronitrile) and azobis(isobutyronitrile).

When the total mass of the first polymerizable monomer in the mixture liquid is regarded as 100 parts by mass, the content of the oil-soluble polymerization initiator is preferably from 0.1 parts by mass to 10 parts by mass, more preferably from 0.5 parts by mass to 7 parts by mass, and still more preferably from 1 part by mass to 5 parts by mass. When the content of the oil-soluble polymerization initiator is from 0.1 parts by mass to 10 parts by mass, a polymerization reaction can progress sufficiently; the oil-soluble polymerization initiator is less likely to remain after the end of the polymerization reaction; and an unexpected side reaction is less likely to progress.

(C) Hydrocarbon Solvent

In the present disclosure, the hydrocarbon solvent is used as a non-polymerizable, sparingly water-soluble organic solvent. The hydrocarbon solvent serves as a spacer material for forming the hollow portion in the interior of the particles. In the suspension step described later, the suspension in which the droplets of the monomer composition containing the hydrocarbon solvent are dispersed in the aqueous medium, is obtained. In the suspension step, phase separation occurs in the droplets of the monomer composition. As a result, the hydrocarbon solvent with low polarity is likely to collect in the interior of the droplets of the monomer composition. In the end, according to their respective polarities, the hydrocarbon solvent is distributed in the interior of the droplets of the monomer composition, and the material not containing the hydrocarbon solvent is distributed at the periphery of the droplets of the monomer composition.

Then, in the polymerization step described later, an aqueous dispersion containing the hollow particles including the hydrocarbon solvent, is obtained. That is, since the hydrocarbon solvent collects in the interior of the particles, the hollow portion filled with the hydrocarbon solvent is formed in the interior of the obtained precursor particles.

The type of the hydrocarbon solvent is not particularly limited. Examples of the hydrocarbon solvent include a saturated hydrocarbon solvent such as butane, pentane, n-hexane, cyclohexane, heptane and octane, an aromatic hydrocarbon solvent such as benzene, toluene and xylene, and a solvent with relatively high volatility such as carbon disulfide and carbon tetrachloride.

The void ratio of the hollow particles can be controlled by changing the amount of the hydrocarbon solvent in the mixture liquid. In the suspension step described later, the polymerization reaction progresses while oil droplets containing the crosslinkable monomer and so on include the hydrocarbon solvent. Accordingly, as the content of the hydrocarbon solvent increases, the void ratio of the obtained hollow particles tends to increase.

For the hydrocarbon solvent, the amount of the saturated hydrocarbon solvent is preferably 50% by mass or more, with respect to the total amount (100% by mass) of the hydrocarbon solvent. Accordingly, sufficient phase separation occurs in the droplets of the monomer composition. As a result, hollow particles having only one hollow portion can be easily obtained, and the production of porous particles can be suppressed. The amount of the saturated hydrocarbon solvent is preferably 60% by mass or more, and more preferably 80% by mass or more, from the point of view that the production of porous particles is further suppressed, and that the hollow portions of the hollow particles are likely to be uniform.

The hydrocarbon solvent is preferably a hydrocarbon solvent having 4 to 7 carbon atoms. A hydrocarbon compound having 4 to 7 carbon atoms can be easily included in the first precursor particles in the polymerization step and can be easily removed from the second precursor particles in the solvent removal step. A hydrocarbon solvent having 5 or 6 carbon atoms is particularly preferred.

From the viewpoint of ease of removal in the solvent removal step described later, the hydrocarbon solvent is preferably a hydrocarbon solvent having a boiling point of 130° C. or less, and more preferably a hydrocarbon solvent having a boiling point of 100° C. or less. The hydrocarbon solvent is preferably a hydrocarbon solvent having a boiling point of 50° C. or more, and more preferably a hydrocarbon solvent having a boiling point of 60° C. or more, from the point of view that the hydrocarbon solvent can be easily included in the first precursor particles.

The relative permittivity at 20° C. of the hydrocarbon solvent is preferably 3 or less. The relative permittivity is one of the indices of the level of the polarity of a compound. In the case where the relative permittivity of the hydrocarbon solvent is 3 or less and sufficiently small, it is considered that phase separation progresses rapidly in the droplets of the monomer composition and the hollow portion is easily formed.

Examples of solvents having a relative permittivity at 20° C. of 3 or less, are as follows. The inside of the parentheses is the value of relative permittivity.

Heptane (1.9), n-hexane (1.9), cyclohexane (2.0), benzene (2.3), and toluene (2.4).

For the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method of measuring the relative permittivity at 20° C. include a relative permittivity test that is in conformity with 23 of JIS C 2101:1999 and is performed with the measuring temperature set to 20° C.

In the present disclosure, with respect to the total mass (100 parts by mass) of the first polymerizable monomer, the content of the hydrocarbon solvent in the mixture liquid is preferably 50 parts by mass or more and 500 parts by mass or less, from the following viewpoints: the particle diameter of the hollow particles is easily controlled; the void ratio is easily increased while maintaining the strength of the hollow particles; and the amount of the residual hydrocarbon solvent in the particles is easily reduced. With respect to the total mass (100 parts by mass) of the first polymerizable monomer, the content of the hydrocarbon solvent in the mixture liquid is more preferably 60 parts by mass or more and 400 parts by mass or less, still more preferably 70 parts by mass or more and 300 parts by mass or less, and even more preferably 80 parts by mass or more and 200 parts by mass or less.

(D) Dispersion Stabilizer

The dispersion stabilizer is an agent for dispersing the droplets of the monomer composition in the aqueous medium in the suspension step. In the present disclosure, an inorganic dispersion stabilizer is preferably used as the dispersion stabilizer, from the point of view that the particle diameter of the droplets can be easily controlled in the suspension and the particle size distribution of the obtained hollow particles can be sharp, and that an excessive decrease in the shell thickness is suppressed and a decrease in the strength of the hollow particles is suppressed.

As the inorganic dispersion stabilizer, examples include, but are not limited to, inorganic compounds including a sulfate such as barium sulfate and calcium sulfate; a carbonate such as barium carbonate, calcium carbonate and magnesium carbonate; a phosphate such as calcium phosphate; a metal oxide such as aluminum oxide and titanium oxide; and a metal hydroxide such as aluminum hydroxide, magnesium hydroxide, calcium hydroxide, barium hydroxide and iron(II)hydroxide. These inorganic dispersion stabilizers may be used alone or in combination of two or more.

Of these inorganic dispersion stabilizers, a sparingly water-soluble inorganic metal salt such as the above-mentioned sulfate, carbonate, phosphate and metal hydroxide is preferred; a metal hydroxide is more preferred; and a magnesium hydroxide is particularly preferred.

In the present disclosure, the sparingly water-soluble inorganic metal salt is preferably an inorganic metal salt such that the solubility in 100 g of water is 0.5 g or less.

In the present disclosure, the sparingly water-soluble inorganic dispersion stabilizer is particularly preferably used in the form of colloidal particles being dispersed in the aqueous medium, that is, in the form of a colloidal dispersion containing the sparingly water-soluble, inorganic dispersion stabilizer colloidal particles. Accordingly, the particle size distribution of the droplets of the monomer composition can be sharp; moreover, the amount of the residual inorganic dispersion stabilizer in the obtained hollow particles can be easily reduced by washing.

The colloidal dispersion containing the sparingly water-soluble inorganic dispersion stabilizer colloidal particles can be prepared by, for example, reacting at least one selected from alkali metal hydroxide salts and alkaline earth metal hydroxide salts with a water-soluble polyvalent metal salt, which is not an alkaline earth metal hydroxide salt, in the aqueous medium.

As the alkali metal hydroxide salts, examples include, but are not limited to, lithium hydroxide, sodium hydroxide and potassium hydroxide. As the alkaline earth metal hydroxide salts, examples include, but are not limited to, barium hydroxide and calcium hydroxide.

The water-soluble polyvalent metal salt may be a water-soluble polyvalent metal salt other than compounds corresponding to the above-mentioned alkaline earth metal hydroxide salts. As the polyvalent metal salt, examples include, but are not limited to, magnesium metal salts such as magnesium chloride, magnesium phosphate and magnesium sulfate; calcium metal salts such as calcium chloride, calcium nitrate, calcium acetate and calcium sulfate; aluminum metal salts such as aluminum chloride and aluminum sulfate; barium salts such as barium chloride, barium nitrate and barium acetate; and zinc salts such as zinc chloride, zinc nitrate and zinc acetate. Among them, magnesium metal salts, calcium metal salts and aluminum metal salts are preferred; magnesium metal salts are more preferred; and magnesium chloride is particularly preferred.

The method for reacting the water-soluble polyvalent metal salt with the at least one selected from alkali metal hydroxide salts and alkaline earth metal hydroxide salts in the aqueous medium, is not particularly limited. As the method, examples include, but are not limited to, mixing an aqueous solution of the water-soluble polyvalent metal salt and an aqueous solution of the at least one selected from alkali metal hydroxide salts and alkaline earth metal hydroxide salts.

The content of the dispersion stabilizer is not particularly limited. With respect to the total mass (100 parts by mass) of the first polymerizable monomer and the hydrocarbon solvent, the content of the dispersion stabilizer is preferably from 0.5 parts by mass to 10 parts by mass, and more preferably from 1.0 part by mass to 8.0 parts by mass. When the content of the dispersion stabilizer is equal to or more than the lower limit value, the droplets of the monomer composition can be sufficiently dispersed in the suspension so that they do not join together. On the other hand, when the content of the dispersion stabilizer is equal to or less than the upper limit value, an increase in the viscosity of the suspension is prevented in the formation of the droplets, and a problem such that a droplet forming machine is clogged with the suspension, can be avoided.

With respect to 100 parts by mass of the aqueous medium, the content of the dispersion stabilizer is generally 2 parts by mass or more and 15 parts by mass or less, and preferably 3 parts by mass or more and 8 parts by mass or less.

(E) Aqueous Medium

In the present disclosure, the term "aqueous medium" means a medium selected from the group consisting of water, a hydrophilic solvent and a mixture thereof.

The hydrophilic solvent in the present disclosure is not particularly limited, as long as it is one that mixes with water sufficiently and does not develop phase separation. Examples of the hydrophilic solvent include alcohols such as methanol and ethanol; tetrahydrofuran (THF); and dimethyl sulfoxide (DMSO).

Among the aqueous media, water is preferably used in terms of its high polarity. When a mixture of water and a hydrophilic solvent is used, from the viewpoint of forming the droplets of the monomer composition, it is important that the polarity of the entire mixture is not too low. In this case, for example, the mixing ratio (mass ratio) between water and the hydrophilic solvent may be set to water:hydrophilic solvent=99:1 to 50:50.

The mixture liquid is obtained by mixing the above-mentioned materials and other materials as needed, appropriately stirring the mixture, etc. In the mixture liquid, an oil phase containing the lipophilic materials such as (A) the first polymerizable monomer, (B) the oil-soluble polymerization initiator and (C) the hydrocarbon solvent, is dispersed with a size of a particle diameter of approximately several millimeters in an aqueous phase containing (D) the dispersion stabilizer, (E) the aqueous medium, etc. The dispersion state of these materials in the mixture liquid can be observed with the naked eye, depending on the types of the materials.

In the mixture liquid preparation step, the mixture liquid may be obtained by simply mixing the above-mentioned materials and other materials as needed, appropriately stirring the mixture, etc. From the point of view that the shell can be easily uniform, it is preferable to prepare the mixture liquid by separately preparing the oil phase containing the first polymerizable monomer and the hydrocarbon solvent with the aqueous phase containing the dispersion stabilizer and the aqueous medium in advance, and then mixing the phases together. In the present disclosure, a colloidal dispersion in which a sparingly water-soluble inorganic dispersion stabilizer is dispersed in the form of colloidal particles in the aqueous medium, can be preferably used as the aqueous phase.

As just described, by separately preparing the oil phase and the aqueous phase in advance and then mixing them, hollow particles such that the composition of the shell portion is uniform, can be produced.

(2) Suspension Step

The suspension step includes suspending the mixture liquid to prepare the suspension in which the droplets of the monomer composition containing the hydrocarbon solvent are dispersed in the aqueous medium.

The suspension method for forming the droplets of the monomer composition is not particularly limited. For example, it is performed using an apparatus capable of performing strong stirring, such as an (in-line type) emulsifying disperser (e.g., a horizontal in-line type disperser such as MILDER (product name, manufactured by Pacific Machinery & Engineering Co., Ltd.) and CAVITRON (product name, manufactured by EUROTEC, Ltd.) and a vertical in-line type disperser such as DRS 2000/5 (product name, manufactured by IKA Works, Inc.)) and a high-speed emulsifying disperser such as T.K. HOMOMIXER MARK II (product name, manufactured by PRIMIX Corporation).

In the suspension prepared in the suspension step, the droplets of the monomer composition containing the lipophilic materials mentioned above and having a particle diameter of from 1 μm to 80 μm, are dispersed uniformly in the aqueous medium. Such droplets of the monomer composition are difficult to observe with the naked eye and can be observed with a known observation instrument such as an optical microscope.

In the suspension step, since phase separation occurs in the droplets of the monomer composition, the hydrocarbon solvent with low polarity is likely to collect in the interior of the droplets. As a result, in the obtained droplets, the hydrocarbon solvent is distributed in the interior thereof, and the material other than the hydrocarbon solvent is distributed at the periphery thereof.

Figure 2:
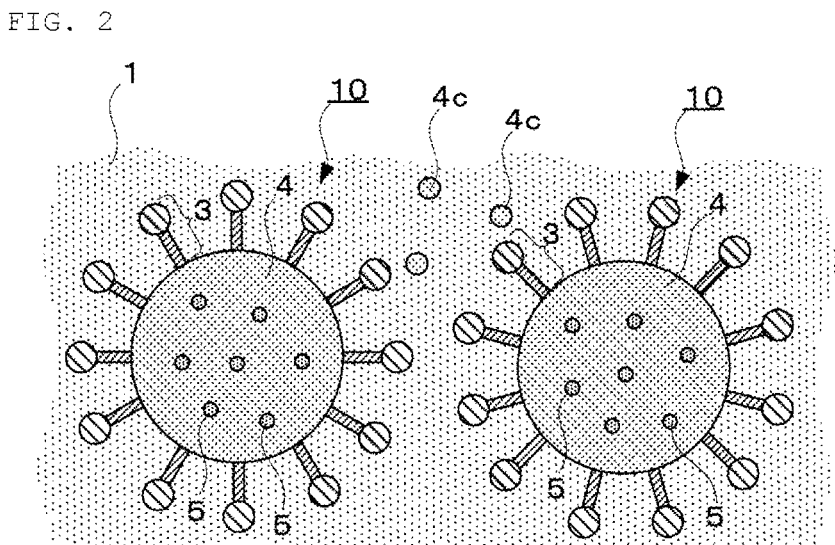
FIG. 2 is a schematic diagram showing an embodiment of a suspension in a suspension step.

FIG. 2 is a schematic diagram showing an embodiment of the suspension in the suspension step. Each droplet 10 of the monomer composition in FIG. 2 schematically shows a cross section thereof. FIG. 2 is merely a schematic diagram, and the suspension in the present disclosure is not limited to that shown in FIG. 2. A part of FIG. 2 corresponds to the diagram (2) of FIG. 1 described above.

FIG. 2 shows a state where the droplets 10 of the monomer composition and the first polymerizable monomer

4c dispersed in the aqueous medium 1, are dispersed in the aqueous medium 1. Each droplet 10 is formed by the oil-soluble monomer composition 4 and a dispersion stabilizer 3 surrounding the periphery of the oil-soluble monomer composition 4.

The monomer composition contains the oil-soluble polymerization initiator 5, the first polymerizable monomer and the hydrocarbon solvent (none of them is illustrated).

Each droplet 10 is a minute oil droplet which contains the monomer composition 4, and the oil-soluble polymerization initiator 5 generates polymerization initiating radicals in the interior of the minute oil droplet. Therefore, the precursor particles with a target particle diameter can be produced without excessively growing the minute oil droplet.

In such a suspension polymerization method using the oil-soluble polymerization initiator, there is no opportunity for the polymerization initiator to come into contact with the polymerizable monomer 4c dispersed in the aqueous medium 1. Thus, the generation of surplus resin particles (e.g., solid particles having a relatively small particle diameter) in addition to the target resin particles having the hollow portion, can be suppressed by using the oil-soluble polymerization initiator.

(3) Polymerization Step (3-1) First Polymerization Step

In the production method, the polymerization step is carried out in two stages.

In the first polymerization step, the first polymerization reaction is performed by subjecting the suspension to a polymerization reaction, until the polymerization conversion rate of the first polymerizable monomer reaches 93% by mass or more. Accordingly, the first precursor composition containing the first precursor particles that have the shell containing the polymer of the first polymerizable monomer and the hollow portion filled with the hydrocarbon solvent, is prepared.

In the first polymerization reaction, the droplets of the monomer composition are subjected to a polymerization reaction while the hydrocarbon solvent is included in them. Accordingly, the polymerization reaction is likely to progress while the shape of the droplets is retained. As a result, the size and void ratio of the obtained hollow particles can be easily controlled by controlling the amount of the hydrocarbon solvent, the type of the dispersion stabilizer, and so on in the first polymerization reaction. Moreover, since the above-described first polymerizable monomer and the hydrocarbon solvent are used together, the polarity of the hydrocarbon solvent is low with respect to the shell of the first precursor particles, and the hydrocarbon solvent is not easily compatible with the shell. Accordingly, sufficient phase separation occurs and only one hollow portion is likely to be formed.

In the first polymerization reaction, the polymerization system is not particularly limited. For example, a batch system, a semicontinuous system or a continuous system may be employed.

In the first polymerization reaction, the polymerization temperature is preferably from 40° C. to 80° C., and more preferably from 50° C. to 70° C.

Also in the first polymerization reaction, the temperature increase rate up to the polymerization temperature, is preferably from 10° C./h to 60° C./h, and more preferably from 15° C./h to 55° C./h.

The polymerization reaction time of the first polymerization reaction is preferably from 0.5 hours to 5 hours, and more preferably from 1 hour to 3 hours.

In the production method, the first polymerization reaction is continued until the polymerization conversion rate of the first polymerizable monomer reaches 93% by mass or more, preferably 95% by mass or more, more preferably 97% by mass or more, and still more preferably 99% by mass or more.

In the present disclosure, the polymerization conversion rate is obtained by the following formula (A) using the mass of the solid component of the first precursor particles obtained by the first polymerization reaction and the mass of the first polymerizable monomer remaining unreacted after the first polymerization reaction. In the present disclosure, the solid component includes all components excluding a solvent, and a liquid polymerizable monomer and the like are included in the solid component. The mass of the unreacted first polymerizable monomer can be measured by gas chromatography (GC).

$$\text{Polymerization conversion rate (\% by mass)} = 100 - \text{(Mass of the unreacted first polymerizable monomer/Mass of the solid component of the first precursor particles)} \times 100 \qquad \text{Formula (A)}$$

(3-2) Second Polymerization Step

In the second polymerization step, the second polymerization reaction is performed by adding the second polymerizable monomer having a solubility of 0.3 g/L or more in distilled water at 20° C. to the first precursor composition obtained by the first polymerization step and subjecting the composition to the polymerization reaction. Accordingly, the second precursor composition containing the second precursor particles that have the shell containing the polymer of the first and second polymerizable monomers and the hollow portion filled with the hydrocarbon solvent, is prepared.

In the second polymerization reaction, the polymerization reaction progresses in the state where the second polymerizable monomer is incorporated in the shell of the first precursor particles. The thermal motion of the shell of the first precursor particles is accelerated by incorporating the second polymerizable monomer in the shell. Accordingly, in the second polymerization reaction, the polymerization reaction of the second polymerizable monomer and the polymerizable functional groups of the first polymerizable monomer remaining unreacted in the shell, is presumed to sufficiently progress and result in the formation of the dense crosslinked structure.

The second polymerizable monomer is not particularly limited, as long as it is a polymerizable monomer having a solubility of 0.3 g/L or more in distilled water at 20° C. From the viewpoint of increasing the strength and solvent resistance of the hollow particles and improving the weight reduction effect and so on exerted by the hollow particles, the second polymerizable monomer is preferably a non-crosslinkable monomer having a solubility of 0.3 g/L or more in distilled water at 20° C., that is, a hydrophilic non-crosslinkable monomer. As the hydrophilic non-crosslinkable monomer used as the second polymerizable monomer, examples include, but are not limited to, the same hydrophilic non-crosslinkable monomers as those that can be used as the first polymerizable monomer. From the viewpoint of increasing the strength and solvent resistance of the hollow particles and improving the weight reduction effect and so on exerted by the hollow particles, at least one selected from the group consisting of an (meth)acrylic acid alkyl ester containing an alkyl group having 1 to 5 carbon atoms, (meth)acrylic acid nitrile and derivatives thereof, and a polar group-containing non-crosslinkable monomer, is preferred; an (meth)acrylic acid alkyl ester containing an alkyl group having 1 to 5 carbon atoms is more preferred; and an (meth)acrylic acid alkyl ester containing an alkyl group having 1 to 4 carbon atoms is still more preferred.

The (meth)acrylic acid alkyl ester and the (meth)acrylic acid nitrile are preferably acrylic acid alkyl ester and acrylic acid nitrile, respectively. When the polymerizable functional group is an acryloyl group and not a methacryloyl group, due to superior reactivity, the weight reduction effect and so on exerted by the hollow particles are likely to be improved, and the second polymerizable monomer is less likely to remain unreacted. In the present disclosure, an acrylic crosslinkable monomer is a crosslinkable monomer in which the polymerizable functional groups include at least one acryloyl group and does not include a methacryloyl group, and it is preferably a crosslinkable monomer in which all the polymerizable functional groups are acryloyl groups.

The alkyl group of the (meth)acrylic acid alkyl ester preferably has 1 to 4 carbon atoms, from the viewpoint of improving the weight reduction effect and so on exerted by the hollow particles. From the point of view that the second polymerizable monomer is less likely to remain unreacted, the alkyl group of the (meth)acrylic acid alkyl ester more preferably has 1 to 3 carbon atoms, and the alkyl group is still more preferably a methyl group.

As the polar group-containing non-crosslinkable monomer, an epoxy group-containing monomer, a hydroxyl group-containing monomer, and an amino group-containing monomer are preferred. The epoxy group-containing monomer used as the polar group-containing non-crosslinkable monomer is preferably glycidyl (meth)acrylate. The hydroxyl group-containing monomer used as the polar group-containing non-crosslinkable monomer is preferably 2-hydroxyethyl methacrylate.

As the second polymerizable monomer, a hydrophilic crosslinkable monomer having a solubility of 0.3 g/L or more in distilled water at 20° C., may be used. As the hydrophilic crosslinkable monomer used as the second polymerizable monomer, examples include, but are not limited to, the same hydrophilic crosslinkable monomers as those that can be used as the first polymerizable monomer. The hydrophilic crosslinkable monomer used as the second polymerizable monomer is preferably a hydrophilic crosslinkable monomer containing a hydroxyl group or an amino group. As the hydroxyl group-containing hydrophilic crosslinkable monomer, for example, 2-hydroxy-3-methacryloyloxypropyl acrylate is preferably used. As the amino group-containing hydrophilic crosslinkable monomer, for example, diallylamine is preferably used.

The solubility of the second polymerizable monomer in distilled water at 20° C., is preferably 2 g/L or more, more preferably 10 g/L or more, and still more preferably 15 g/L or more, due to the following reasons: it becomes easier for the second polymerizable monomer to be incorporated in the shell of the first precursor particles to accelerate the thermal motion of the shell, and the strength of the hollow particles is increased. The upper limit of the solubility of the second polymerizable monomer in distilled water at 20° C., is not particularly limited, and it is generally 80 g/L or less.

The molecular weight of the second polymerizable monomer is preferably 200 or less, and more preferably 100 or less, from the following points of view: it becomes easier for the second polymerizable monomer to be incorporated in the shell of the first precursor particles to accelerate the thermal motion of the shell; the strength and solvent resistance of the hollow particles are increased; and the weight reduction effect and so on exerted by the hollow particles are improved. The lower limit of the molecular weight of the second polymerizable monomer is not particularly limited, and it is generally 50 or more.

The amount of the added second polymerizable monomer is preferably from 3 parts by mass to 15 parts by mass, and more preferably from 4 parts by mass to 10 parts by mass, with respect to 100 parts by mass of the first polymerizable monomer. When the amount of the added second polymerizable monomer is equal to or more than the lower limit value, the effect of accelerating the polymerization reaction by the addition of the second polymerizable monomer, is increased, and the crosslinked structure of the shell of the hollow particles is more densified. Accordingly, the strength and solvent resistance of the hollow particles are increased and, as a result, the weight reduction effect and so on exerted by the hollow particles are improved. On the other hand, when the amount of the added second polymerizable monomer is equal to or less than the upper limit value, a decrease in the content of the first polymerizable monomer with respect to the whole polymerizable monomers used to form the shell, is suppressed. Since the first polymerizable monomer contains a large amount of the crosslinkable monomer, by suppressing a decrease in the content of the first polymerizable monomer, hollow particles which contain many crosslinked structures formed by the crosslinkable monomers and which have excellent strength, are obtained.

In the second polymerization reaction performed after the addition of the second polymerizable monomer, the polymerization system is not particularly limited, and the same polymerization system as the system used in the first polymerization reaction, may be employed.

The polymerization temperature of the second polymerization reaction is preferably from 40° C. to 80° C., and more preferably from 50° C. to 70° C.

The reaction time of the second polymerization reaction is preferably from 1 hour to 6 hours, and more preferably from 2 hours to 4 hours.

By the above-described production method, the amount of the unreacted polymerizable monomer remaining after the second polymerization reaction, can be controlled to preferably 750 ppm or less, more preferably 500 ppm or less, and still more preferably 300 ppm or less. When the amount of the unreacted polymerizable monomer remaining after the second polymerization reaction, is equal to or less than the upper limit value, it is suggested that the reaction rate of the polymerizable monomer is high. When the reaction rate of the polymerizable monomer is high, the crosslinked structure in the shell is likely to be dense and, as a result, the solvent resistance and strength of the hollow particles are likely to increase.

In the present disclosure, the amount of the unreacted polymerizable monomer remaining after the second polymerization reaction, means the ratio of the mass of the polymerizable monomer remaining unreacted to the mass of the solid component of the hollow particles obtained by the second polymerization reaction. The mass of the unreacted polymerizable monomer can be measured by gas chromatography (GC).

(4) Solid-Liquid Separation Step

The solid-liquid separation step includes performing solid-liquid separation of the second precursor composition, which contains the hollow particles (the second precursor particles) including the hydrocarbon solvent and which is obtained by the above-described polymerization step, to obtain a solid component containing the second precursor particles.

The method of performing the solid-liquid separation of the second precursor composition is not particularly limited, and a known method may be used. Examples of the solid-liquid separation method include a centrifugation method, a filtration method, and still-standing separation. Among them, a centrifugation method or a filtration method may be employed, and from the viewpoint of simplicity of the operation, a centrifugation method may be employed.

Any step such as a preliminary drying step may be performed at a time after the solid-liquid separation step and before performing the solvent removal step described later. Examples of the preliminary drying step include performing preliminary drying on the solid component obtained after the solid-liquid separation step, by use of a drying apparatus such as a dryer and a drying appliance such as a hand dryer.

(5) Solvent Removal Step

The solvent removal step includes removing the hydrocarbon solvent from the hollow particles (the second precursor particles) obtained by the solid-liquid separation step.

By removing the hydrocarbon solvent from the second precursor particles in a gaseous atmosphere, the hydrocarbon solvent in the interior of the second precursor particles is substituted with air, and the hollow particles filled with gas are obtained.

In this step, the term "in a gaseous atmosphere" includes "in an environment where no liquid component exists in the outside of the second precursor particles" and "in an environment where only a very small amount of liquid component at a level that does not influence the removal of the hydrocarbon solvent, exists in the outside of the second precursor particles" in a strict sense. The term "in a gaseous atmosphere" can be reworded as a state where the second precursor particles do not exist in a slurry, or it can be reworded as a state where the second precursor particles exist in a dry powder. That is, in this step, it is important to remove the hydrocarbon solvent in an environment where the second precursor particles come into direct contact with the outside gas.

The method of removing the hydrocarbon solvent from the second precursor particles in a gaseous atmosphere, is not particularly limited, and a known method may be employed. Examples of the method include a reduced pressure drying method, a heat drying method, a flash drying method, and the combination of these methods.

Especially, in the case of using the heat drying method, the heating temperature needs to be set to more than or equal to the boiling point of the hydrocarbon solvent and less than or equal to the highest temperature at which the shell structure of the second precursor particles does not collapse. Accordingly, depending on the composition of the shell and the type of the hydrocarbon solvent in the second precursor particles, the heating temperature may be from 50° C. to 200° C., may be from 70° C. to 200° C., or may be from 100° C. to 200° C., for example.

The hydrocarbon solvent in the interior of the second precursor particles is substituted with the outside gas by the drying operation in the gaseous atmosphere. As a result, the hollow particles in which the hollow portion is occupied by gas, are obtained.

The drying atmosphere is not particularly limited. Possible examples of the drying atmosphere include air, oxygen, nitrogen and argon. Further, by filling the interior of the hollow particles with gas once and then performing reduced pressure drying, hollow particles in which the interior is evacuated are also temporarily obtained.

As another method, the hydrocarbon solvent may be removed as follows: the second precursor composition obtained in the polymerization step, which is in the form of slurry, is not subjected to solid-liquid separation and, instead, in the slurry containing the second precursor particles and the aqueous medium, the hydrocarbon solvent included in the second precursor particles is substituted with the aqueous medium of the slurry, thereby removing the hydrocarbon solvent.

In this method, at a temperature equal to or more than the temperature obtained by subtracting 35° C. from the boiling point of the hydrocarbon solvent, an inert gas is bubbled into the second precursor composition. Accordingly, the hydrocarbon solvent can be removed from the second precursor particles.

When the hydrocarbon solvent is a mixed solvent containing several types of hydrocarbon solvents and it has several boiling points, the boiling point of the hydrocarbon solvent in the solvent removal step is determined as the boiling point of the solvent having the highest boiling point among the solvents contained in the mixed solvent, that is, the highest boiling point of the several boiling points.

The temperature at the time of bubbling the inert gas into the second precursor composition, is preferably a temperature equal to or more than the temperature obtained by subtracting 30° C. from the boiling point of the hydrocarbon solvent, and more preferably a temperature equal to or more than the temperature obtained by subtracting 20° C. from the boiling point of the hydrocarbon solvent, from the viewpoint of reducing the amount of the residual hydrocarbon solvent in the hollow particles. The temperature at the time of bubbling is generally set to a temperature equal to or more than the polymerization temperature of the polymerization step. The temperature at the time of bubbling is not particularly limited, and it may be 50° C. or more and 100° C. or less.

The inert gas used for the bubbling is not particularly limited. As the inert gas, examples include, but are not limited to, nitrogen and argon.

Depending on the type and amount of the hydrocarbon solvent, the bubbling condition is appropriately controlled so that the hydrocarbon solvent can be removed from the second precursor particles. The bubbling condition is not particularly limited. For example, the inert gas may be bubbled in an amount of 1 L/min to 3 L/min for 1 hour to 10 hours.

By this method, an aqueous slurry in which the aqueous medium is included in the second precursor particles, is obtained. The slurry is subjected to solid-liquid separation to obtain hollow particles, and the aqueous medium is removed from the hollow particles, thereby obtaining the hollow particles in which the hollow portion is occupied by gas.

The method for obtaining the hollow particles in which the hollow portion is filled with gas, by subjecting the second precursor composition in the form of slurry to solid-liquid separation and then removing the hydrocarbon solvent from the second precursor particles in the gaseous atmosphere, is compared to the method for obtaining the hollow particles in which the hollow portion is filled with gas, by substituting, in the slurry containing the second precursor particles and the aqueous medium, the hydrocarbon solvent included in the second precursor particles with the aqueous medium of the slurry, subjecting the slurry to solid-liquid separation, and then removing the aqueous medium from the second precursor particles in the gaseous atmosphere. As a result, the former method is advantageous in that the hollow particles are less likely to collapse in the hydrocarbon solvent removal step, and the latter method is advantageous in that the amount of the residual hydrocarbon solvent is decreased by bubbling the inert gas.

In the case of substituting the hydrocarbon solvent included in the second precursor particles with water, there is a problem in that obtained hollow resin particles collapse if the same volume of water as the hydrocarbon solvent released from the particles, is not introduced into the particles. For example, a possible means to prevent the problem is thought to be as follows: the pH of the slurry is adjusted to 7 or more; the shell of the particles is swollen with alkali; and then the hydrocarbon solvent is removed from the particles. In this case, the shell of the particles obtains flexibility. Accordingly, the substitution of the hydrocarbon solvent in the interior of the particles with water progresses quickly.

Also, the hydrocarbon solvent included in the second precursor particles may be removed therefrom after the polymerization step and before the solid-liquid separation step, without the solid-liquid separation of the second precursor composition in a slurry form obtained in the polymerization step, by use of the following method, for example: evaporating the hydrocarbon solvent included in the second precursor particles from the second precursor composition at a predetermined pressure (a high, normal or reduced pressure), or evaporating the hydrocarbon solvent included in the second precursor particles from the second precursor composition by introducing water vapor or inert gas such as nitrogen, argon and helium to the second precursor composition at a predetermined pressure (a high, normal or reduced pressure).

(6) Others

In addition to the steps (1) to (5) mentioned above, the following washing step (6-a) and the following hollow portion re-substitution step (6-b) may be added, for example.

(6-a) Washing Step

The washing step includes carrying out washing by adding acid or alkali, for removal of the dispersion stabilizer remaining in the second precursor composition containing the second precursor particles before the solid-liquid separation step. When the dispersion stabilizer used is an acid-soluble inorganic dispersion stabilizer, washing is preferably carried out by adding acid to the second precursor composition containing the second precursor particles. When the dispersion stabilizer used is an alkali-soluble inorganic compound, washing is preferably carried out by adding alkali to the second precursor composition containing the second precursor particles.

When the acid-soluble inorganic dispersion stabilizer is used as the dispersion stabilizer, the pH of the second precursor composition is preferably controlled to 6.5 or less, and more preferably 6 or less, by adding acid to the second precursor composition containing the second precursor particles. As the added acid, an inorganic acid such as sulfuric acid, hydrochloric acid and nitric acid or an organic acid such as formic acid and acetic acid may be used. Of them, sulfuric acid is particularly preferred, due to its high dispersion stabilizer removal efficiency and small influence on production equipment.

(6-b) Hollow Portion Re-Substitution Step

The hollow portion re-substitution step includes resubstituting the gas or liquid in the interior of the hollow particles with another gas or liquid. By such substitution, the environment of the interior of the hollow particles can be changed; molecules can be selectively confined in the interior of the hollow particles; or the chemical structure of the interior of the hollow particles can be modified in accordance with the intended application thereof.

II-2. Step of Preparing Resin Composition

The method for producing the fiber-reinforced molded body of the present disclosure includes preparing a resin composition containing the hollow particles obtained by the above step, the matrix resin and the solvent. In this step, the resin composition is prepared by mixing, for example, the hollow particles, the matrix resin, the solvent, and additives that are added as needed.

The content of the hollow particles in the resin composition is not particularly limited. From the viewpoint of reducing the weight of the fiber-reinforced molded body, the content of the hollow particles in the solid content of the resin composition is preferably 5% by mass or more, more preferably 10% by mass or more, and still more preferably 15% by mass or more. From the viewpoint of suppressing a deterioration in the properties of the fiber-reinforced molded body, the content of the hollow particles in the solid content of the resin composition is preferably 50% by mass or less, and more preferably 30% by mass or less.

The matrix resin used in this step is the matrix resin in the state before curing, which is used for the above-described fiber-reinforced molded body of the present disclosure.

As the matrix resin used in this step, for example, a resin containing an epoxy-based resin is preferably used. As the epoxy-based resin, examples include, but are not limited to, bixylenol-type epoxy resin, bisphenol A-type epoxy resin, bisphenol F-type epoxy resin, bisphenol S-type epoxy resin, bisphenol AF-type epoxy resin, dicyclopentadiene-type epoxy resin, trisphenol-type epoxy resin, naphthol novolac-type epoxy resin, phenol novolac-type epoxy resin, tert-butyl-catechol-type epoxy resin, naphthalene-type epoxy resin, naphthol-type epoxy resin, anthracene-type epoxy resin, glycidyl amine-type epoxy resin, glycidyl ester-type epoxy resin, cresol novolac-type epoxy resin, phenol aralkyl-type epoxy resin, biphenyl-type epoxy resin, linear aliphatic epoxy resin, butadiene structure-containing epoxy resin, alicyclic epoxy resin, heterocyclic epoxy resin, spiro ring-containing epoxy resin, cyclohexane-type epoxy resin, cyclohexanedimethanol-type epoxy resin, naphthylene ether-type epoxy resin, trimethylol-type epoxy resin, tetraphenylethane-type epoxy resin, isocyanurate-type epoxy resin, phenolphthalimidine-type epoxy resin, and phenolphthalein-type epoxy resin. These epoxy-based resins may be used alone or in combination of two or more.

The matrix resin used in this step may contain a resin curing additive such as a curing agent, a curing catalyst and a curing accelerator. The resin curing additive contained in the matrix resin, is not particularly limited and may be selected from known additives, depending on the type of the resin. As the additive, examples include, but are not limited to, amines, acid anhydrides, imidazoles, thiols, phenols, naphthols, benzoxazines, cyanate esters and carbodiimides.

As the curing agent used in combination with the epoxy-based resin, examples include, but are not limited to, an amine-based curing agent, an amide-based curing agent, an acid anhydride-based curing agent, a phenol-based curing agent, an active ester-based curing agent, a carboxyl group-containing curing agent, and a thiol-based curing agent.

As the curing catalyst used in combination with the epoxy-based resin, examples include, but are not limited to, a phosphorus-based compound, a tertiary amine-based compound, an imidazole-based compound and an organic metal salt.

These resin curing additives may be used alone or in combination of two or more.

The viscosity of the matrix resin used in the present disclosure is not particularly limited. By controlling the type and amount of the solvent, the viscosity of the whole resin composition may be adjusted so that excellent impregnation of the reinforcing fibers with the resin composition is achieved.

The content of the matrix resin in the resin composition is not particularly limited. From the viewpoint of impregnability of the reinforcing fibers with the resin composition and the mechanical properties of the fiber-reinforced molded body, the content of the matrix resin in the solid content of the resin composition is preferably 50% by mass or more, and more preferably 70% by mass or more. From the viewpoint of reducing the weight of the fiber-reinforced molded body, the content of the matrix resin in the solid content of the resin composition is preferably 95% by mass or less, more preferably 90% by mass or less, and still more preferably 85% by mass or less.

As the solvent used in this step, a known solvent applicable to the resin composition can be used. The solvent used in this step is not particularly limited, and it is appropriately selected depending on the type, viscosity and so on of the matrix resin. As the solvent, examples include, but are not limited to, an aromatic hydrocarbon such as benzene, toluene and xylene; a ketone such as dioxane, acetone, methyl ethyl ketone, methyl isobutyl ketone and cyclohexanone; an ether such as ethylene glycol monomethyl ether and propylene glycol monomethyl ether. These solvents may be used alone or in combination of two or more.

From the point of view that the weight reduction effect and so on can be easily exerted by the hollow particles, the solvent preferably contains at least one selected from a ketone and an ether, and the solvent more preferably contains a ketone.

The content of the solvent in the resin composition is not particularly limited, and it is appropriately controlled so that the resin composition has the viscosity that makes the reinforcing fibers to be easily impregnated with the resin composition. From the point of view that the weight reduction effect and so on are easily exerted by the hollow particles of the present disclosure, the content of the solvent is preferably from 10% by mass to 50% by mass, and more preferably from 20% by mass to 40% by mass, in the total mass (100% by mass) of the resin composition.

The viscosity of the resin composition is not particularly limited, as long as it makes the reinforcing fibers to be impregnated with the resin composition.

The resin composition may further contain additives as needed, such as a UV absorber, a colorant, a defoaming agent, a thickener, a thermal stabilizer, a leveling agent, a lubricant, an antistatic agent and a filler, to the extent that does not impair the effects of the present disclosure.

In this step, the components are required to be mixed at a temperature at which the solvent does not volatilize, such as a temperature which is equal to or more than room temperature and which is equal to or less than the boiling point of the solvent. When the resin composition contains the thermosetting resin as the matrix resin, the components are required to be mixed in a temperature environment below the curing temperature of the thermosetting resin. The temperature environment is not particularly limited, and in general, the components are mixed in a temperature environment of 240° C. or less.

When the resin composition contains the thermoplastic resin as the matrix resin, the components may be mixed by melt-kneading such that the thermoplastic resin is melted by heating. The temperature of the melt-kneading is not particularly limited, as long as it is a temperature at which the thermoplastic resin used can be melted. From the viewpoint of suppressing a collapse of the hollow particles, the melt-kneading temperature is preferably 250° C. or less.

II-3. Step of Impregnating Reinforcing Fibers with Resin Composition

The method for producing the fiber-reinforced molded body of the present disclosure includes impregnating the reinforcing fibers with the resin composition obtained by the above step. A composite material obtained in this step, in which the reinforcing fibers are impregnated with the resin composition, is generally called a "prepreg".

The reinforcing fibers used in this step are the same as the reinforcing fibers used in the above-described fiber-reinforced molded body of the present disclosure.

The method for impregnating the reinforcing fibers with the resin composition is not particularly limited. For example, the wet method that has been used for prepreg production, such as immersing the reinforcing fibers in the resin composition and then removing the solvent therefrom, may be used.

The method for removing the solvent from the resin composition applied to the reinforcing fibers, is not particularly limited. As the method, examples include, but are not limited to, natural drying, heat drying, and a combination thereof. The heat drying temperature is not particularly limited. Depending on the type of the solvent and that of the matrix resin, a temperature at which the solvent can be removed from the resin composition while the resin composition is kept in an uncured or semi-cured state, is appropriately selected, and it is generally from 40° C. to 250° C. For heat drying, a common drying device such as an oven may be used. The heat drying time is not particularly limited, and it is generally from one minute to one hour.

II-4. Other Steps

The method for producing the fiber-reinforced molded body of the present disclosure may further include curing the resin composition applied to the reinforcing fibers.

As the method for curing the resin composition applied to the reinforcing fibers, examples include, but are not limited to, a method of heating and pressurizing the composite material, in which the reinforcing fibers are impregnated with the resin composition, by press molding, autoclave molding, sheet winding molding, bag molding, a wrapping tape method, internal pressure molding, sheet-wrap molding or the like. Also, the resin composition may be cured by stacking sheets that are made of the composite material, in which the reinforcing fibers are impregnated with the resin composition, and then curing the resin composition in the sheets. In the curing, a support or the like may be stacked on the composite material or the sheets. As the material for the support, examples include, but are not limited to, a resin such as polyethylene terephthalate and polyethylene naphthalate, and a metal such as copper, stainless-steel, aluminum, nickel, chromium, gold and silver.

The heating and pressurizing condition for curing the resin composition is not particularly limited, and it is appropriately adjusted depending on the composition of the resin composition, the contents of the components, the forms of the components, and so on. For example, the heating and pressurizing may be performed at a temperature of 23° C. to 250° C. for 5 minutes to 24 hours.

EXAMPLES

Hereinbelow, the present disclosure is described more specifically using examples and comparative examples.

However, the present disclosure is not limited to these examples. Also, "part(s)" and "%" are on a mass basis unless otherwise specified.

Production Example 1

(1) Mixture Liquid Preparation Step

First, the following materials were mixed to produce an oil phase.

Ethylene glycol dimethacrylate (80 parts) and pentaerythritol tetraacrylate (20 parts) as the first polymerizable monomers 2,2'-Azobis(2,4-dimethylvaleronitrile) (an oil-soluble polymerization initiator manufactured by Wako Pure Chemical Industries, Ltd., product name: V-65): 3 parts Cyclohexane: 125 parts Next, in a stirring tank, under a room temperature condition, an aqueous solution in which 12.1 parts of sodium hydroxide (an alkali metal hydroxide) was dissolved in 121 parts of ion-exchanged water, was gradually added under stirring to an aqueous solution in which 17.1 parts of magnesium chloride (a water-soluble polyvalent metal salt) was dissolved in 494 parts of ion-exchanged water, thereby preparing a magnesium hydroxide colloidal dispersion (a sparingly water-soluble metal hydroxide colloidal dispersion) (magnesium hydroxide: 4 parts). The obtained dispersion was used as an aqueous phase.

The obtained aqueous phase and oil phase were mixed, thereby preparing a mixture liquid.

(2) Suspension Step

The mixture liquid obtained in the mixture liquid preparation step was stirred with a disperser (product name: HOMO MIXER, manufactured by: PRIMIX Corporation) for one minute at a rotational frequency of 4,000 rpm to be suspended, thereby preparing a suspension in which droplets of a monomer composition including cyclohexane, were dispersed in water.

(3) Polymerization Step

In a nitrogen atmosphere, the temperature of the suspension obtained in the suspension step was increased from 40° C. to 65° C. for 30 minutes (temperature increase rate: 50° C./hour), and then the suspension was stirred for one and a half hours in a temperature condition of 65° C., thereby performing the first polymerization reaction. Accordingly, the first precursor composition containing the first precursor particles, was obtained. The polymerization conversion rate at the end of the first polymerization reaction, was 99.2% by mass. Then, as the second polymerizable monomer, 5 parts of methyl acrylate was added to the stirring tank, and in a nitrogen atmosphere, they were stirred for two and a half hours in a temperature condition of 65° C., thereby performing the second polymerization reaction. By the second polymerization reaction, the second precursor composition containing the second precursor particles including cyclohexane, was obtained.

(4) Washing Step and Solid-Liquid Separation Step

The second precursor composition obtained in the polymerization step was washed (25° C., 10 minutes) with dilute sulfuric acid to bring the pH of the composition to 5.5 or less. Next, water was separated therefrom by filtration. Then, 200 parts of ion-exchanged water was added to the resultant to make a slurry again, and a water washing treatment (washing, filtration and dehydration) was repeatedly performed several times at room temperature (25° C.). The resultant was separated by filtration, thereby obtaining a solid component. The obtained solid component was dried with a dryer at a temperature of 40° C., thereby obtaining the second precursor particles including cyclohexane.

(5) Solvent Removal Step

The second precursor particles obtained in the solid-liquid separation step were subjected to heating treatment for 6 hours with a vacuum dryer in a vacuum condition at 200° C., thereby removing the hydrocarbon solvent from the particles. Accordingly, the hollow particles of Production Example 1 were obtained. From the scanning electron microscopy observation result and void ratio value of the obtained hollow particles, the particles were confirmed to be spherical and to have a hollow portion.

Production Example 2

The hollow particles of Production Example 2 were produced in the same manner as Production Example 1, except that in the above-mentioned "(1) Mixture liquid preparation step", the amount of the added cyclohexane was changed to 160 parts.

Production Examples 3 to 8

The hollow particles of Production Examples 3 to 8 were produced in the same manner as Production Example 1, except that in the above-mentioned "(3) Polymerization step", the type or amount of the added second polymerizable monomer was changed as shown in Table 1.

Comparative Production Example 1

The hollow particles of Comparative Production Example 1 were produced in the same manner as Production Example 1, except that in the above-mentioned "(3) Polymerization step", the second polymerizable monomer was not added, and the second polymerization reaction was not performed.

Comparative Production Example 2

The hollow particles of Comparative Production Example 2 were produced in the same manner as Production Example 1, except that in the above-mentioned "(3) Polymerization step", the first polymerization reaction time was changed from one and a half hours to 30 minutes, and the second polymerization reaction was performed by adding the second polymerizable monomer when the polymerization conversion rate of the first polymerizable monomer (ethylene glycol dimethacrylate and pentaerythritol tetraacrylate) reached 91.0% by mass.

Comparative Production Example 3

The hollow particles of Comparative Production Example 3 were produced in the same manner as Production Example 1, except that in the above-mentioned "(1) Mixture liquid preparation step", the type and amount of the first polymerizable monomer were changed as shown in Table 1.

Comparative Production Example 4

The hollow particles of Comparative Production Example 4 were produced in the same manner as Production Example 1, except that in the above-mentioned "(3) Polymerization step", 5 parts of styrene (having a solubility of 0.2 g/L in distilled water at 20° C.) was added as the second polymerizable monomer, instead of 5 parts of methyl acrylate.

TABLE 1

| | | | Production Example 1 | Production Example 2 | Production Example 3 | Production Example 4 |
|---|---|---|---|---|---|---|
| First polymerizable monomer | Non-crosslinkable monomer | Methyl methacrylate (MMA) (Parts) | | | | |
| | | Styrene (ST) (Parts) | | | | |
| | Crosslinkable monomer | Ethylene glycol dimethacrylate (Parts) | 80 | 80 | 80 | 80 |
| | | Pentaerythritol tetraacrylate (Parts) | 20 | 20 | 20 | 20 |
| Oil-soluble polymerization initiator (Parts) | | | 3 | 3 | 3 | 3 |
| Hydrocarbon solvent | | Cyclohexane (Parts) | 125 | 160 | 125 | 125 |
| Polymerization conversion rate (%) when adding the second polymerizable monomer | | | 99.2 | 99.2 | 98.7 | 99.8 |
| Second polymerizable monomer | Non-crosslinkable monomer | Methyl acrylate (MA) (Parts) | 5 | 5 | 13 | 19 |
| | | Styrene (ST) (Parts) | | | | |
| | | Ethyl acrylate (EA) (Parts) | | | | |
| | | Butyl acrylate (BA) (Parts) | | | | |
| | | Acrylonitrile (AN) (Parts) | | | | |
| | | Methyl methacrylate (MMA) (Parts) | | | | |
| Solubility (g/L) in distilled water at 20° C. | | | 60 | 60 | 60 | 60 |
| Residual monomer amount (ppm) | | | 15 | 18 | 10 | 9 |

TABLE 1-continued

| | | | Production Example 5 | Production Example 6 | Production Example 7 | Production Example 8 |
|---|---|---|---|---|---|---|
| First polymerizable monomer | Non-crosslinkable monomer | Methyl methacrylate (MMA) (Parts) | | | | |
| | | Styrene (ST) (Parts) | | | | |
| | Crosslinkable monomer | Ethylene glycol dimethacrylate (Parts) | 80 | 80 | 80 | 80 |
| | | Pentaerythritol tetraacrylate (Parts) | 20 | 20 | 20 | 20 |
| Oil-soluble polymerization initiator (Parts) | | | 3 | 3 | 3 | 3 |
| Hydrocarbon solvent | Cyclohexane (Parts) | | 125 | 125 | 125 | 125 |
| Polymerization conversion rate (%) when adding the second polymerizable monomer | | | 99.3 | 99.0 | 99.2 | 99.3 |
| Second polymerizable monomer | Non-crosslinkable monomer | Methyl acrylate (MA) (Parts) | | | | |
| | | Styrene (ST) (Parts) | | | | |
| | | Ethyl acrylate (EA) (Parts) | 5 | | | |
| | | Butyl acrylate (BA) (Parts) | | 5 | | |
| | | Acrylonitrile (AN) (Parts) | | | 5 | |
| | | Methyl methacrylate (MMA) (Parts) | | | | 5 |
| Solubility (g/L) in distilled water at 20° C. | | | 15 | 2 | 70 | 16 |
| Residual monomer amount (ppm) | | | 187 | 216 | 13 | 731 |

| | | | Comparative Production Example 1 | Comparative Production Example 2 | Comparative Production Example 3 | Comparative Production Example 4 |
|---|---|---|---|---|---|---|
| First polymerizable monomer | Non-crosslinkable monomer | Methyl methacrylate (MMA) (Parts) | | | 30 | |
| | | Styrene (ST) (Parts) | | | | |
| | Crosslinkable monomer | Ethylene glycol dimethacrylate (Parts) | 80 | 80 | 70 | 80 |
| | | Pentaerythritol tetraacrylate (Parts) | 20 | 20 | — | 20 |
| Oil-soluble polymerization initiator (Parts) | | | 3 | 3 | 3 | 3 |
| Hydrocarbon solvent | Cyclohexane (Parts) | | 125 | 125 | 125 | 125 |
| Polymerization conversion rate (%) when adding the second polymerizable monomer | | | — | 91.0 | 95.3 | 99.5 |
| Second polymerizable monomer | Non-crosslinkable monomer | Methyl acrylate (MA) (Parts) | | 5 | 5 | |
| | | Styrene (ST) (Parts) | | | | 5 |
| | | Ethyl acrylate (EA) (Parts) | | | | |
| | | Butyl acrylate (BA) (Parts) | | | | |
| | | Acrylonitrile (AN) (Parts) | | | | |
| | | Methyl methacrylate (MMA) (Parts) | | | | |
| Solubility (g/L) in distilled water at 20° C. | | | — | 60 | 60 | 0.2 |
| Residual monomer amount (ppm) | | | 990 | 787 | 879 | 952 |

[Evaluation]

1. Polymerization Conversion Rate

From the first precursor composition produced by the first polymerization reaction in the polymerization step of the production examples and comparative production examples, 50 g of the first precursor composition was taken and subjected to pressure filtration, thereby obtaining the first precursor particles (containing water and the hydrocarbon solvent) contained in the first precursor composition. The obtained first precursor particles were precisely weighed in milligrams. Next, 27 g of ethyl acetate was added to about 3 g of the precisely weighed first precursor particles, and they were stirred for 15 minutes. Then, 13 g of methanol was added thereto, and they were mixed for 10 minutes. A solution thus obtained was left to stand to deposit an insoluble component, and the supernatant of the solution was collected as a measurement sample. Next, 2 μL of the measurement sample was injected into a gas chromatograph, and the amount of the polymerizable monomer in the measurement sample was quantified by gas chromatography (GC) in the following condition. The quantified amount was regarded as the mass of the unreacted first polymerizable monomer. Also, the first precursor particles obtained by the pressure filtration were dried at 200° C. for two hours for removal of the water and the hydrocarbon solvent, and the mass of the solid component of the first precursor particles was obtained. Then, the polymerization conversion rate was calculated by the following formula (A).

$$\text{Polymerization conversion rate (\% by mass)} = 100 - (\text{Mass of the unreacted first polymerizable monomer/Mass of the solid component of the first precursor particles}) \times 100 \qquad \text{Formula (A)}$$

<Condition of GC>
Column: TC-WAX (0.25 mm×30 m)
Column temperature: 80° C.
Injection temperature: 200° C.
FID detection side temperature: 200° C.
2. Residual Monomer Amount
First, 3 g of the hollow particles were precisely weighed in milligrams. Next, 27 g of ethyl acetate was added thereto, and they were stirred for 15 minutes. Then, 13 g of methanol was added thereto, and they were stirred for 10 minutes. A solution thus obtained was left to stand to deposit an insoluble component, and the supernatant of the solution was collected as a measurement sample. Next, 2 μl of the measured sample was injected into a gas chromatograph, and the amount of the unreacted polymerizable monomer in the measurement sample was quantified by gas chromatography (GC) in the following condition. The content of the unreacted polymerizable monomer contained in the hollow particles was calculated and regarded as the residual monomer amount.
<Condition of GC>
Column: TC-WAX (0.25 mm×30 m)
Column temperature: 80° C.
Injection temperature: 200° C.
FID detection side temperature: 200° C.
For the hollow particles obtained in the production examples and the comparative production examples, Table 2 shows the content (% by mass) of each monomer unit in the polymer contained in the shell.
The hollow particles obtained in the production examples and the comparative production examples were measured and evaluated as follows. The results are shown in Table 2.
3. Volume Average Particle Diameter
The particle diameter of each hollow particle was measured using a laser diffraction particle size distribution measuring apparatus (product name: SALD-2000, manufactured by: Shimadzu Corporation), and the volume average of the particle diameters was calculated and used as the volume average particle diameter.
4. Density and Void Ratio
4-1. Measurement of Apparent Density
First, approximately 30 cm³ of the hollow particles were introduced into a measuring flask with a volume of 100 cm³, and the mass of the introduced hollow particles was precisely weighed. Next, the measuring flask in which the hollow particles were introduced, was precisely filled with isopropanol up to the marked line while care was taken so that air bubbles did not get in. The mass of the isopropanol added to the measuring flask was precisely weighed, and the apparent density $D_1$ (g/cm³) of the hollow particles was calculated by the following formula (I).

$$\text{Apparent density } D_1 = [\text{Mass of the hollow particles}]/(100 - [\text{Mass of the isopropanol}]/[\text{Specific gravity of the isopropanol at the measuring temperature}]) \qquad \text{Formula (I)}$$

4-2. Measurement of True Density
The hollow particles were pulverized in advance; approximately 10 g of the pulverized hollow particles were introduced into a measuring flask with a volume of 100 cm³; and the mass of the introduced pulverized particles was precisely weighed.
Then, similarly to the measurement of the apparent density mentioned above, isopropanol was added to the measuring flask; the mass of the isopropanol was precisely weighed; and the true density $D_G$ (g/cm³) of the hollow particles was calculated by the following formula (II).

$$\text{True density } D_0 = [\text{Mass of the pulverized hollow particles}]/(100 - [\text{Mass of the isopropanol}]/[\text{Specific gravity of the isopropanol at the measuring temperature}]) \qquad \text{Formula (II)}$$

4-3. Calculation of Void Ratio
The void ratio of the hollow particles was calculated by the following formula (III) from the apparent density $D_1$ and the true density $D_3$.

$$\text{Void ratio (\%)} = 100 - (\text{Apparent density } D_1/\text{True density } D_0) \times 100 \qquad \text{Formula (III)}$$

5. Immersion Test
In an environment at 25° C., 0.1 mg of the hollow particles were added to 4 mL of acetone, and a mixture thus obtained was shaken for 10 minutes at a shaking rate of 100 rpm by use of a shaking device and then left to stand for 48 hours. Then, the ratio of the hollow particles thus submerged was obtained and evaluated according to the following evaluation criteria. The hollow particles submerged in the acetone were separated by a centrifuge, and the separated hollow particles were dried. Then, the mass of the hollow particles submerged in the acetone was measured. The ratio of the mass of the hollow particles submerged in the acetone to the mass of the whole hollow particles immersed in the acetone, was calculated, thereby obtaining the ratio of the submerged hollow particles.
(Evaluation Criteria of the Immersion Test)
　○: Less than 5% by mass of the hollow particles submerged.
　x: 5% By mass or more of the hollow particles submerged.

TABLE 2

| | | Production Example 1 | Production Example 2 | Production Example 3 | Production Example 4 |
|---|---|---|---|---|---|
| Crosslinkable monomer unit | Ethylene glycol dimethacrylate | 76.2 | 76.2 | 70.8 | 65.8 |

TABLE 2-continued

| | | | | | |
|---|---|---|---|---|---|
| (% by mass) | Pentaerythritol tetraacrylate | 19.0 | 19.0 | 17.7 | 15.7 |
| Non-crosslinkable monomer unit (% by mass) | MA | 4.8 | 4.8 | 11.5 | 18.5 |
| | ST | | | | |
| | EA | | | | |
| | BA | | | | |
| | AN | | | | |
| | MMA | | | | |
| Properties of particles | Volume average particle diameter (μm) | 9.5 | 9.6 | 9.2 | 9.3 |
| | Void ratio (%) | 65 | 70 | 65 | 65 |
| | Immersion test (acetone) | ○ | ○ | ○ | ○ |

| | | Production Example 5 | Production Example 6 | Production Example 7 | Production Example 8 |
|---|---|---|---|---|---|
| Crosslinkable monomer unit (% by mass) | Ethylene glycol dimethacrylate | 76.2 | 76.2 | 76.2 | 76.2 |
| | Pentaerythritol tetraacrylate | 19.0 | 19.0 | 19.0 | 19.0 |
| Non-crosslinkable monomer unit (% by mass) | MA | | | | |
| | ST | | | | |
| | EA | 4.8 | | | |
| | BA | | 4.8 | | |
| | AN | | | 4.8 | |
| | MMA | | | | 4.8 |
| Properties of particles | Volume average particle diameter (μm) | 9.2 | 9.0 | 8.9 | 9.6 |
| | Void ratio (%) | 65 | 65 | 65 | 65 |
| | Immersion test (acetone) | ○ | ○ | ○ | ○ |

| | | Comparative Production Example 1 | Comparative Production Example 2 | Comparative Production Example 3 | Comparative Production Example 4 |
|---|---|---|---|---|---|
| Crosslinkable monomer unit (% by mass) | Ethylene glycol dimethacrylate | 80.0 | 76.2 | 66.6 | 76.2 |
| | Pentaerythritol tetraacrylate | 20.0 | 19.0 | | 19.0 |
| Non-crosslinkable monomer unit (% by mass) | MA | | 4.8 | 4.8 | |
| | ST | | | | 4.8 |
| | EA | | | | |
| | BA | | | | |
| | AN | | | | |
| | MMA | | | 28.6 | |
| Properties of particles | Volume average particle diameter (μm) | 9.3 | 9.4 | 9.6 | 9.7 |
| | Void ratio (%) | 65 | 65 | 65 | 65 |
| | Immersion test (acetone) | x | x | x | x |

[Consideration]

As for the hollow particles obtained in Comparative Production Examples 1 to 4, as shown in Table 2, 5% by mass or more of the hollow particles submerged in the acetone in the immersion test.

In Comparative Production Example 1, it is presumed that since the polymerization reaction was performed in one step, unreacted polymerizable functional groups remained in the shell, and the crosslinked structure of the shell was loose. It is also presumed that acetone easily permeated the obtained hollow particles due to the circumstances mentioned above.

In Comparative Production Example 2, it is presumed that since the second polymerizable monomer was added before the polymerization conversion rate of the first polymerizable monomer reached 93% by mass and the second polymerizable monomer was added too early, unreacted polymerizable functional groups remained in the shell, and the crosslinked structure of the shell was loose. It is also presumed that acetone easily permeated the obtained hollow particles due to the circumstances mentioned above.

In Comparative Production Example 3, it is presumed that since the content of the crosslinkable monomer in the first polymerizable monomer was small and since the amount of the non-crosslinkable monomer remaining unreacted was large, the crosslinked structure of the shell was loose. It is also presumed that acetone easily permeated the obtained hollow particles due to the circumstances mentioned above.

In Comparative Production Example 4, it is presumed that since the styrene having a solubility of 0.2 g/L in distilled water at 20° C., was used as the second polymerizable monomer instead of the hydrophilic monomer having a solubility of 0.3 g/L or more in distilled water at 20° C., the second polymerizable monomer was less likely to be incorporated in the shell. It is also presumed that since the second polymerizable monomer was less likely to be incorporated in the shell, unreacted polymerizable functional groups remained in the shell, and the crosslinked structure of the shell was loose. It is also presumed that acetone easily permeated the obtained hollow particles due to the circumstances mentioned above.

As for the hollow particles obtained in Production Examples 1 to 8, the shell of the hollow particles contained the polymer in which from 80 parts by mass or more of a crosslinkable monomer unit was contained in 100 parts by mass of all monomer units, and less than 5% by mass of the hollow particles submerged in the acetone in the immersion test. In Production Examples 1 to 8, the first polymerizable monomer contained in the mixture liquid sufficiently contained the crosslinkable monomer, and in the polymerization step, when the polymerization conversion rate of the first polymerizable monomer reached 93% by mass or more, the second polymerizable monomer having a solubility of 0.3 g/L or more in distilled water at 20° C., was added to the suspension, and the suspension was further subjected to a polymerization reaction. It is presumed that due to the above conditions of Production Examples 1 to 8, despite the use of a large amount of the crosslinkable monomer, very few unreacted polymerizable functional groups remained in the shell, and the crosslinked structure of the shell was dense. It is also presumed that the hollow particles less permeable to acetone were obtained due to the circumstances mentioned above.

Examples 1 to 10 and Comparative Examples 1 to 4

(1) Preparation of Resin Composition (Varnish)

First, 50 parts of epoxy resin (manufactured by Daicel Corporation, product name: EHPE3150CE), 24.9 parts of a curing agent (manufactured by DIC Corporation, product name: LF6161, an MEK solution (solid content 65%)), 0.1 parts of 2-ethyl-4-methylimidazole (2E4MZ, manufactured by Nacalai Tesque, Inc.) as a curing catalyst, and methyl ethyl ketone (MEK) in the amount shown in Table 3 were mixed. The mixture was stirred for 30 minutes at room temperature. After stirring the mixture, the hollow particles obtained in Production Example 1, which were in the amount shown in Table 3, were added to the mixture, and the mixture was further stirred for one hour, thereby producing the resin composition (varnish) of Example 1, which had a solid content of about 70%. In the same manner as above, the resin compositions (varnishes) of Examples 2 to 10 and Comparative Examples 1 to 4, each having a solid content of about 70%, were produced by use of the hollow particles obtained in Production Examples 2 to 8 and Comparative production Examples 1 to 4 in the amounts shown in Table 3.

(2) Production of Prepregs

A carbon fiber sheet (manufactured by: Mitsubishi Chemical Corporation, product name: TR3110MS, thickness: 200 μm, weight per unit area: 200 g/m$^2$) cut to a size of 300 mm×200 mm was prepared. Next, 25 ml to 30 ml of the resin composition of Example 1 was applied to the cut sheet. The carbon fiber sheet to which the resin composition was applied, was hung to cause the excess resin composition to fall under its own weight. Then, the sheet was naturally dried in air, and then it was dried in a hot air circulation oven at 140° C. for 30 minutes, thereby obtaining the prepreg of Example 1. Another prepreg of Example 1 was produced in the same manner as above. The prepregs of Examples 2 to 10 and Comparative Examples 1 to 4 were obtained in the same manner as Example 1, except that the resin compositions (varnishes) of Examples 2 to 10 and Comparative Examples 1 to 4 were used.

(3) Production of Fiber-Reinforced Molded Body

A SUS plate, a PET film (manufactured by Nippa Corporation, product name: SFL, thickness: 50 μm), a stack of the two prepregs of Example 1 obtained above, another PET film (manufactured by Nippa Corporation, product name: SFL, thickness: 50 μm) and another SUS plate were stacked in this order. This stack was fed into a vacuum press machine and heated and pressurized for 20 minutes at 120° C. and 0.5 MPa. Then, the temperature of the heating temperature was further increased to 205° C. (4° C./min) and kept at that temperature for one hour. Then, the stack was removed from the vacuum press machine, thereby obtaining the plate-shaped molded body of Example 1. The plate-shaped molded bodies of Examples 2 to 10 and Comparative Examples 1 to 4 were obtained in the same manner as Example 1, except that the prepregs of Examples 2 to 10 and Comparative Examples 1 to 4 were used.

Comparative Example 51

First, 50 parts of epoxy resin (manufactured by Daicel Corporation, product name: EHPE3150CE), 24.9 parts of a curing agent (manufactured by DIC Corporation, product name: LF6161, an MEK solution (solid content 65%)), 0.1 parts of 2-ethyl-4-methylimidazole (2E4MZ, manufactured by Nacalai Tesque, Inc.) as a curing catalyst, and 20 parts of methyl ethyl ketone (MEK) were mixed. The mixture was stirred for 30 minutes at room temperature, thereby producing the resin composition (varnish) of Comparative Example 5.

Using the obtained varnish, the molded body of Comparative Example 5 was produced in the same manner as Example 1 to 10 and Comparative Examples 1 to 4.

[Evaluation]

6. Specific Gravity of Fiber-Reinforced Molded Body

In accordance with JIS K7112, the specific gravity of each of the obtained fiber-reinforced molded bodies was measured by the underwater replacement method.

7. Contents of the Hollow Particles and Reinforcing Fibers in Fiber-Reinforced Molded Body The prepregs obtained as the intermediate were cut into a size of 150 mm×150 mm, and the cut sheets were used as measurement prepregs. The mass of each measurement prepreg was measured, and the mass of the carbon fibers in each measurement prepreg was calculated from the weight per unit area (200 g/m$^2$) of the carbon fibers. For each measurement prepreg, from the mass of the prepreg and the mass of the carbon fibers in the prepreg, the content (% by mass) of the resin in the prepreg was calculated by the formula (1). From the content (% by mass) of the resin and from the content (% by mass) of the hollow particles in the solid content of the resin composition applied to the reinforcing fibers, the mass-based content (% by mass) of the hollow particles was calculated by the formula (2). As the "mass of the fiber-reinforced molded body" in the formula (1), the mass of the measurement prepreg was used.

The content (% by mass) of the reinforcing fibers was calculated as the ratio of the mass of the reinforcing fibers in each measurement prepreg to the mass of the measurement prepreg.

In each example, a total of six measurement prepregs were cut from the prepregs obtained in the example. The mass-based content of the hollow particles and the mass-based content of the reinforcing fibers were calculated for the six measurement prepregs. The mass-based content of the hollow particles in the fiber-reinforced molded body, and the mass-based content of the reinforcing fibers in the fiber-reinforced molded body were each determined as the average of the values calculated for the six measurement prepregs.

The mass-based content of the hollow particles and that of the reinforcing fibers in the fiber-reinforced molded bodies of Examples 2 to 10 and Comparative Examples 1 to 4, were calculated in the same manner as Example 1.

8. Volume-Based Content of Hollow Particles in Fiber-Reinforced Molded Bodies

Using the content (% by mass) of the hollow particles, that of the matrix resin and that of the reinforcing fibers in the measurement prepreg used in the above-described "7. Contents of the hollow particles and reinforcing fibers in fiber-reinforced molded body", the volume of the hollow particles, the volume of the matrix resin and the volume of the reinforcing fibers were calculated by the formulae (3), (4) and (5) mentioned above. The volume-based content (% by volume) of the hollow particles was calculated by the formula (6) mentioned above.

A cured product was obtained by heating and pressurizing the resin composition produced in Comparative Example 5 in the same condition as Example 1. The true density of the cured product was measured and used as the specific gravity (g/cm$^3$) of the cured matrix resin in the formula (4).

9. Tensile Elastic Modulus and Tensile Strength

The fiber-reinforced molded body was cut perpendicular to its cloth winding direction to obtain a measurement sample. The measurement sample was cut into a size of 130 mm×15 mm so that the cloth winding direction was the short axis direction. The obtained strip was used as a test specimen. In accordance with JIS K 7165:2008, the tensile test of the test specimen was carried out in the following condition to obtain the tensile elastic modulus and tensile strength of the fiber-reinforced molded body.

<Condition of tensile test>

Tester: A$^G$-5kNI (product name, manufactured by Shimadzu Corporation)

Load cell: 5 t

Chuck: Wedge-type chuck

Tensile rate: 1 mm/min

Chuck distance: 60 mm

Temperature: 25° C.

Humidity: 50% RH

More specifically, in each example, a total of five strips were cut from measurement samples and used as test specimens, and the tensile elastic modulus and tensile strength of the five test specimens were measured. From the five tensile elastic moduli thus obtained, the highest and lowest values were excluded, and the average of the remaining three tensile elastic moduli was calculated and determined as the tensile elastic modulus of the fiber-reinforced molded body. In the same manner, the tensile strength of the fiber-reinforced molded body was obtained.

TABLE 3

| | | | | | Example 1 | Example 2 | Example 3 | Example 4 | Example 5 |
|---|---|---|---|---|---|---|---|---|---|
| Resin Composition | Hollow particles | | Type | | Production Example 1 | Production Example 1 | Production Example 1 | Production Example 2 | Production Example 3 |
| | | | Content (% by mass) of crosslinkable monomer unit | | 95.2 | 95.2 | 95.2 | 95.2 | 88.5 |
| | | | Type of non-crosslinkable monomer | | MA | MA | MA | MA | MA |
| | | | Void ratio (%) | | 65 | 65 | 65 | 70 | 65 |
| | | | Amount (parts) | | 7.4 | 16.6 | 22.1 | 16.6 | 16.6 |
| | | | Content (% by mass) of hollow particles in solid content | | 10 | 20 | 25 | 20 | 20 |
| | Matrix resin | Resin | Type | | Epoxy | Epoxy | Epoxy | Epoxy | Epoxy |
| | | | Amount (Parts) | | 50 | 50 | 50 | 50 | 50 |
| | | Curing agent | Amount (Parts) | | 24.9 | 24.9 | 24.9 | 24.9 | 24.9 |
| | | Curing catalyst | Amount (Parts) | | 0.1 | 0.1 | 0.1 | 0.1 | 0.1 |
| | Solvent | | Type | | MEK | MEK | MEK | MEK | MEK |
| | | | Amount (Parts) | | 22 | 26 | 30 | 26 | 26 |
| Molded body | | Specific gravity | (g/cm$^3$) | | 1.30 | 1.18 | 1.11 | 1.13 | 1.19 |
| | | Content of hollow particles | (% by mass) | | 5.3 | 11.1 | 15.8 | 11.0 | 11.2 |
| | | | (% by volume) | | 16.5 | 30.6 | 39.8 | 30.3 | 30.8 |
| | Reinforcing fibers | | Type | | Carbon fibers | Carbon fibers | Carbon fibers | Carbon fibers | Carbon fibers |
| | | | Content (% by mass) | | 46 | 45 | 45 | 45 | 43 |
| | | Tensile elastic modulus | (GPa) | | 16.2 | 14.6 | 15.1 | 14.8 | 14.8 |
| | | Tensile strength | (MPa) | | 423 | 415 | 420 | 413 | 430 |

| | | | | | Example 6 | Example 7 | Example 8 | Example 9 | Example 10 |
|---|---|---|---|---|---|---|---|---|---|
| Resin Composition | Hollow particles | | Type | | Production Example 4 | Production Example 5 | Production Example 6 | Production Example 7 | Production Example 8 |
| | | | Content (% by mass) of crosslinkable monomer | | 81.5 | 95.2 | 95.2 | 95.2 | 95.2 |
| | | | Type of non-crosslinkable monomer | | MA | EA | BA | AN | MMA |
| | | | Void ratio (%) | | 65 | 65 | 65 | 65 | 65 |
| | | | Amount (parts) | | 16.6 | 16.6 | 16.6 | 16.6 | 16.6 |
| | | | Content (% by mass) of hollow particles in solid content | | 20 | 20 | 20 | 20 | 20 |
| | Matrix resin | Resin | Type | | Epoxy | Epoxy | Epoxy | Epoxy | Epoxy |
| | | | Amount (Parts) | | 50 | 50 | 50 | 50 | 50 |
| | | Curing agent | Amount (Parts) | | 24.9 | 24.9 | 24.9 | 24.9 | 24.9 |
| | | Curing calalyst | Amount (Parts) | | 0.1 | 0.1 | 0.1 | 0.1 | 0.1 |
| | Solvent | | Type | | MEK | MEK | MEK | MEK | MEK |
| | | | Amount (Parts) | | 26 | 26 | 26 | 26 | 26 |

TABLE 3-continued

| Molded body | Specific gravity | (g/cm³) | 1.19 | 1.20 | 1.18 | 1.19 | 1.18 |
|---|---|---|---|---|---|---|---|
| | Content of hollow particles | (% by mass) | 11.1 | 10.9 | 11.2 | 11.1 | 11.0 |
| | | (% by volume) | 30.6 | 30.1 | 30.8 | 30.6 | 30.3 |
| | Reinforcing fibers | Type | Carbon fibers | Carbon fibers | Carbon fibers | Carbon fibers | Carbon fibers |
| | | Content (% by mass) | 45 | 44 | 44 | 45 | 44 |
| | Tensile elastic modulus | (GPa) | 14.9 | 14.7 | 14.9 | 15.1 | 14.9 |
| | Tensile strength | (MPa) | 433 | 431 | 428 | 421 | 429 |

| | | | Comparative Example 1 | Comparative Example 2 | Comparative Example 3 | Comparative Example 4 | Comparative Example 5 |
|---|---|---|---|---|---|---|---|
| Resin Composition | Hollow particles | Type | Comparative Production Example 1 | Comparative Production Example 2 | Comparative Production Example 3 | Comparative Production Example 4 | — |
| | | Content (% by mass) of crosslinkable monomer | 100.0 | 95.2 | 66.6 | 95.2 | — |
| | | Type of non-crosslinkable monomer | — | MA | MA, MMA | ST | — |
| | | Void ratio (%) | 65 | 65 | 65 | 65 | — |
| | | Amount (parts) | 16.6 | 16.6 | 16.6 | 16.6 | — |
| | | Content (% by mass) of hollow particles in solid content | 20 | 20 | 20 | 20 | — |
| | Matrix resin | Resin | Type | Epoxy | Epoxy | Epoxy | Epoxy | Epoxy |
| | | | Amount (Parts) | 50 | 50 | 50 | 50 | 50 |
| | | Curing agent | Amount (Parts) | 24.9 | 24.9 | 24.9 | 24.9 | 24.9 |
| | | Curing catalyst | Amount (Parts) | 0.1 | 0.1 | 0.1 | 0.1 | 0.1 |
| | Solvent | | Type | MEK | MEK | MEK | MEK | MEK |
| | | | Amount (Parts) | 26 | 26 | 26 | 26 | 20 |
| Molded body | Specific gravity | (g/cm³) | 1.36 | 1.45 | 1.45 | 1.38 | 1.48 |
| | Content of hollow particles | (% by mass) | — | — | — | — | 0.0 |
| | | (% by volume) | — | — | — | — | 0.0 |
| | Reinforcing fibers | Type | Carbon fibers | Carbon fibers | Carbon fibers | Carbon fibers | — |
| | | Content (% by mass) | 50 | 51 | 52 | 51 | — |
| | Tensile elastic modulus | (GPa) | — | — | — | — | 16.0 |
| | Tensile strength | (MPa) | — | — | — | — | 443 |

[Consideration]

As shown in Table 3, for the fiber-reinforced molded bodies of Comparative Examples 1 to 4, which were obtained by use of the varnishes that contained 20% by mass of the hollow particles of Comparative Production Examples 1 to 4, respectively, their specific gravities were from 1.36 g/cm³ to 1.45 g/cm³ and decreased by only 0.03 g/cm³ to 0.12 g/cm³ compared the fiber-reinforced molded body of Comparative Example 5 (specific gravity: 1.48 g/cm³), which was free of hollow particles.

For the fiber-reinforced molded body of Example 1, which was obtained by use of the varnish that contained 10% by mass of the hollow particles of Production Example 1, the content of the hollow particles was smaller than Comparative Examples 1 to 4; however, the specific gravity was 1.30 g/cm³ and decreased by as much as 0.18 g/cm³ compared to the fiber-reinforced molded body of Comparative Example 5, which was free of hollow particles.

For the fiber-reinforced molded body of Example 2, which was obtained by use of the varnish that contained 20% by mass of the hollow particles of Production Example 1, the specific gravity was 1.18 g/cm³ and decreased by as much as 0.30 g/cm³ compared to the fiber-reinforced molded body of Comparative Example 5, which was free of hollow particles.

For the fiber-reinforced molded body of Example 3, which was obtained by use of the varnish that contained 25% by mass of the hollow particles of Production Example 1, the specific gravity was 1.11 g/cm³ and decreased by as much as 0.37 g/cm³ compared to the fiber-reinforced molded body of Comparative Example 5, which was free of hollow particles.

For the fiber-reinforced molded bodies of Examples 4 to 10, which were obtained by use of the varnishes that contained 20% by mass of the hollow particles of Production Examples 2 to 8, respectively, their specific gravities were from 1.13 g/cm³ to 1.20 g/cm³ and decreased by as much as 0.28 g/cm³ to 0.35 g/cm³ compared to the fiber-reinforced molded body of Comparative Example 5, which was free of hollow particles.

As shown in Table 2, for the hollow particles of Comparative Production Examples 1 to 4, 5% by mass or more of the hollow particles submerged in the acetone in the immersion test, and it is presumed that the hollow particles were likely to collapse since the crosslinked structure of the shell was loose. Accordingly, it is presumed that the fiber-reinforced molded bodies of Comparative Examples 1 to 4, which contained the hollow particles of Comparative Production Examples 1 to 4, respectively, failed to achieve sufficient weight reduction since the hollow particles collapsed and the void was not maintained in the molded body production process.

Meanwhile, as shown in Table 2, for the hollow particles of Production Examples 1 to 8, the shell contains a large amount of crosslinkable monomer unit; less than 5% by mass of the hollow particles submerged in the acetone in the immersion test; and it is presumed that the hollow particles were less likely to collapse since the crosslinked structure of the shell was dense. Accordingly, it is presumed that the fiber-reinforced molded bodies of Examples 1 to 10, which contained the hollow particles of Examples 1 to 8, achieved sufficient weight reduction since the hollow particles were less likely to collapse and the void was maintained in the molded body production process.

A comparison between Examples 1 to 3 showed that the weight of the fiber-reinforced molded body decreased as the content of the hollow particles increased.

A comparison between Examples 2 and 4 showed that the weight of the fiber-reinforced molded body decreased as the void ratio of the hollow particles increased.

A comparison between Examples 2, 5 and 6 showed that the weight of the fiber-reinforced molded body decreased as the content of the crosslinkable monomer unit in the shell of the hollow particles increased. The reason is presumed as follows: since the content of the crosslinkable monomer unit in the shell was large, the crosslinked structure of the shell was densified, and the solvent resistance and strength of the hollow particles increased.

A comparison between Examples 2 and 7 to 10 showed that the specific gravities of the fiber-reinforced molded bodies varied depending on the type of the second polymerizable monomer used in the production of the hollow particles. There was a tendency that the specific gravities decreased when an acrylic acid alkyl ester containing an alkyl group having 1 to 4 carbon atoms was used as the second polymerizable monomer.

Also, the fiber-reinforced molded bodies of Examples 1 to 10 had such a tensile elastic modulus and a tensile strength, that are in ranges that make the molded body practicable.

REFERENCE SIGNS LIST

1. Aqueous medium
2. Low polarity material
3. Dispersion stabilizer
4. Monomer composition
4a. Hydrocarbon solvent
4b. Material not containing hydrocarbon solvent
4c. Polymerizable monomer dispersed in aqueous medium
5. Oil-soluble polymerization initiator
6. Shell
8. Hollow portion
10. Droplet
20. Hollow particle including hydrocarbon solvent in the hollow portion (the second precursor particle)

100. Hollow particle having a hollow portion filled with gas

The invention claimed is:

1. A fiber-reinforced molded body comprising a matrix resin, reinforcing fibers and hollow particles,
   wherein the hollow particles comprise a shell containing a resin and a hollow portion surrounded by the shell;
   wherein the shell contains, as the resin, a polymer in which from 81.5 parts by mass or more and 98 parts by mass or less of a crosslinkable monomer unit and 2 parts by mass or more of a hydrophilic non-crosslinkable monomer unit are contained in 100 parts by mass of all monomer units,
   wherein the crosslinkable monomer unit comprises a bifunctional crosslinkable monomer unit derived from a bifunctional crosslinkable monomer and a trifunctional or higher-functional crosslinkable monomer unit derived from a trifunctional or higher-functional crosslinkable monomer,
   wherein the hydrophilic non-crosslinkable monomer unit is derived from a hydrophilic non-crosslinkable monomer having a solubility of 0.3 g/L or more in distilled water at 20° C.,
   wherein a content of the bifunctional crosslinkable monomer unit is 65 parts by mass or more, and a content of the trifunctional or higher-functional crosslinkable monomer unit is 15 parts by mass or more, in 100 parts by mass of all monomer units of the polymer; and
   wherein, in a hollow particle immersion test in which a mixture obtained by adding 0.1 mg of the hollow particles to 4 mL of acetone and shaking them for 10 minutes at a shaking rate of 100 rpm, is left to stand for 48 hours in an environment at 25° C., less than 5% by mass of the hollow particles submerge in the acetone.

2. The fiber-reinforced molded body according to claim 1, wherein, in 100 parts by mass of all monomer units of the polymer, a content of the hydrophilic non-crosslinkable monomer unit is from 2 parts by mass to 18.5 parts by mass.

\* \* \* \* \*